(12) United States Patent
Tange et al.

(10) Patent No.: US 9,444,512 B2
(45) Date of Patent: Sep. 13, 2016

(54) SEMICONDUCTOR DEVICE AND HIGH-FREQUENCY MODULE

(71) Applicant: Murata Manufacturing Co., Ltd., Kyoto (JP)

(72) Inventors: Eigo Tange, Kyoto (JP); Shigeki Koya, Kyoto (JP); Yasushi Shigeno, Kyoto (JP); Akishige Nakajima, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 100 days.

(21) Appl. No.: 14/361,448

(22) PCT Filed: Nov. 26, 2012

(86) PCT No.: PCT/JP2012/080488
§ 371 (c)(1),
(2) Date: May 29, 2014

(87) PCT Pub. No.: WO2013/084739
PCT Pub. Date: Jun. 13, 2013

(65) Prior Publication Data
US 2014/0328223 A1 Nov. 6, 2014

(30) Foreign Application Priority Data
Dec. 9, 2011 (JP) ................. 2011-269731

(51) Int. Cl.
*H04B 1/38* (2015.01)
*H04B 1/525* (2015.01)
(Continued)

(52) U.S. Cl.
CPC ............. *H04B 1/525* (2013.01); *H04B 1/0064* (2013.01); *H04B 1/44* (2013.01); *H04B 15/04* (2013.01)

(58) Field of Classification Search
CPC ...... H04B 1/525; H04B 1/0064; H04B 1/44; H04B 15/04

USPC ......................................................... 375/219
See application file for complete search history.

(56) References Cited

U.S. PATENT DOCUMENTS

2005/0047038 A1   3/2005   Nakajima et al.
2008/0317154 A1   12/2008  Nakajima et al.
(Continued)

FOREIGN PATENT DOCUMENTS

JP   2005-72671 A   3/2005
JP   2008-11131 A   1/2008
(Continued)

OTHER PUBLICATIONS

International Search Report for Application No. PCT/JP2012/080488 dated Dec. 25, 2012.
(Continued)

*Primary Examiner* — David S Huang
(74) *Attorney, Agent, or Firm* — Pearne & Gordon LLP

(57) ABSTRACT

Reduction of intermodulation distortion in a high-frequency switch is achieved. A semiconductor device (1) includes an antenna terminal (ANT_LB), plural external terminals (RX_LB, TX_LB, TRX_LB, TERM_LB), plural first high-frequency switches (101 to 104), and plural control terminals. Each first high-frequency switch includes plural first field-effect transistors, plural first resistors (Rg_1 to Rg_6) connected to the gate terminals of the first field-effect transistors, and a second resistor (Rc) disposed between the corresponding control terminal and the first resistors. The second resistor in the first high-frequency switch disposed between the first terminal supplied with an RF transmission signal and an RF reception signal of a frequency division duplex system and the antenna terminal is configured so that linearity of current-voltage characteristics thereof is higher than linearity of current-voltage characteristics of the first resistor.

11 Claims, 10 Drawing Sheets

(51) Int. Cl.
*H04B 1/00* (2006.01)
*H04B 15/04* (2006.01)
*H04B 1/44* (2006.01)

(56) References Cited

U.S. PATENT DOCUMENTS

2009/0243512 A1* 10/2009 Nagumo .............. G03G 15/326
   315/294
2010/0069020 A1  3/2010 Koya et al.

FOREIGN PATENT DOCUMENTS

JP  2010-258150 A  11/2010
WO  2008/056747 A1  5/2008

OTHER PUBLICATIONS

Written Opinion issued in Application No. PCT/JP2012/080488 dated Dec. 25, 2012.

* cited by examiner

SEMICONDUCTOR DEVICE AND HIGH-FREQUENCY MODULE

TECHNICAL FIELD

The present invention relates to a semiconductor device having incorporated therein an antenna switch for a wireless communication system and a high-frequency module having the semiconductor device incorporated therein, and more particularly, to an effective technique of reducing intermodulation distortion in an antenna switch.

BACKGROUND ART

Recently, in the field of mobile phones, markets for third-generation mobile phones of a wideband-code division multiple access (W-CDMA) system in addition to a global system for mobile communications (GSM) (registered trademark) system have rapidly grown. The W-CDMA system is a frequency division duplex (FDD) communication system in which a frequency band is divided into a frequency band for a transmission signal and a frequency band for a reception signal to simultaneously perform transmission and reception, unlike the GSM system. A signal path through which signals of different frequencies are simultaneously transmitted has a problem in that a signal (intermodulation distortion (IMD)) combined by addition or subtraction of harmonic components and fundamental components of the signals is generated to interfere with the main signals. For example, in an antenna switch used in a mobile terminal performing communications in an FDD system such as W-CDMA, there is a serious problem in that since a reception signal has a power level lower than a transmission signal, the intermodulation distortion serves as radio interference with a reception band to lower reception sensitivity. Therefore, the intermodulation distortion in an antenna switch is considered as an important characteristic along with high-order harmonic distortion (HD).

An antenna switch according to the related art is disclosed in Patent Document 1. In an antenna switch MMIC illustrated in FIG. 2 of Patent Document 1, a high-frequency switch is installed between a terminal connected to an antenna and a terminal receiving a transmission signal and between the terminal connected to the antenna and a terminal receiving a reception signal. The high-frequency switch is embodied by forming high electron mobility transistors (HEMTs) as a multi-gate transistor (such as dual-gate FET, triple-gate FET), and the gates of the transistors constituting the multi-gate are supplied with a control signal for controlling ON and OFF states of the HEMTs via a gate-control resistor. The gate-control resistor includes plural gate resistors connected to the gates of the transistors, respectively, and a coupling resistor for coupling and connecting the gate resistors to a control line through which the control signal is supplied.

CITATION LIST

Patent Document

Patent Document 1: Pamphlet of International Publication No. WO2008/056747

BRIEF SUMMARY OF THE INVENTION

However, the gate resistor is a semiconductor resistor formed of a semiconductor integrated circuit and thus is a nonlinear resistor. Since the gate resistors of the HEMTs of the high-frequency switch which is turned off are unevenly supplied with a leaking RF signal, there can be intermodulation distortion. Accordingly, in Patent Document 1, a circuit configuration illustrated in FIG. 5 is employed to reduce the intermodulation distortion in the high-frequency switch. That is, the gate resistors are connected as illustrated in FIG. 5 of Patent Document 1 so as to supply a leaking RF signal at an even level to the gate of an HEMT when the HEMT is turned off. Accordingly, distortion of currents flowing in the gate resistors in the high-frequency switch which is turned off is suppressed to reduce the intermodulation distortion.

As described above, it is beneficial to additionally reduce the intermodulation distortion in consideration of rapid growth of the market for third-generation mobile phones of a W-CDMA system or the like. In order to further reduce the intermodulation distortion, a method of developing a new device having high linearity with high resistance can be considered. However, new development requires a long development time and immense development costs and thus is not realistic. A method of reducing the intermodulation distortion by raising a resistance value of the gate-control resistor may be considered. However, an increase in resistance causes an increase in chip area and chip cost.

An object of the present invention is to provide a technique of reducing intermodulation distortion in a high-frequency switch.

The object, other objects, and novel features of the present invention will become apparent from the following detailed description and the attached drawings.

Summary of a representative invention disclosed in this description will be described below in brief as follows.

That is, a semiconductor device includes: an antenna terminal connected to an antenna; a plurality of external terminals configured to be supplied with an RF signal; a plurality of first high-frequency switches disposed between the antenna terminal and the external terminals; and a plurality of control terminals configured to receive a control signal for switching ON and OFF states of the first high-frequency switches. Each first high-frequency switch includes a plurality of first field-effect transistors disposed between the corresponding external terminal and the antenna terminal and connected in series, a plurality of first resistors connected to the gate terminals of the plurality of first field-effect transistors, and a second resistor disposed between the corresponding control terminal and the first resistors. At least one terminal of the plurality of external terminals is a first terminal configured to be supplied with an RF transmission signal and an RF reception signal of a frequency division duplex system, and the second resistor in the first high-frequency switch disposed between the first terminal and the antenna terminal is configured so that linearity of current-voltage characteristics thereof is higher than linearity of current-voltage characteristics of the first resistor.

An effect obtained from the representative aspect of the present invention disclosed in this description will be described below in brief.

That is, it is possible to further reduce intermodulation distortion.

DETAILED DESCRIPTION OF THE DRAWINGS

1. Summary of Embodiments

Figure 1:
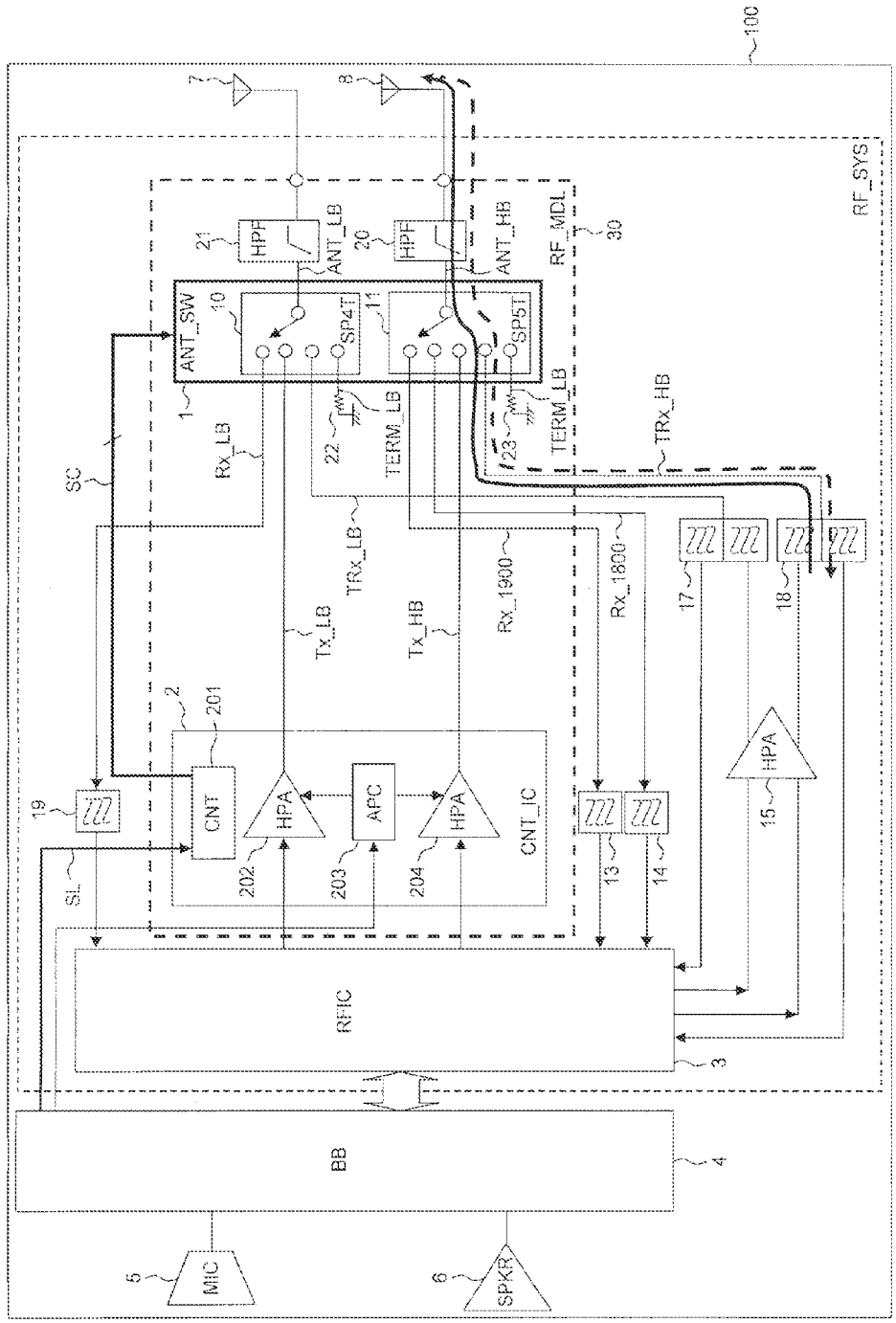
FIG. 1 is a block diagram illustrating a mobile phone having a semiconductor device including an antenna switch according to Embodiment 1.

First, a summary of representative embodiments of the present invention disclosed in this application will be described below. Reference signs of the drawings written in parentheses in the summary of the representative embodiments merely represent that an element having a reference sign attached thereto belongs to the concept of the corresponding element.

[1] (A Resistor Having High Linearity is Used as a Coupling Resistor in a Switch of an FDD Transceiving Terminal)

A semiconductor device (1) according to a representative embodiment of the present invention includes: an antenna terminal (ANT_LB, ANT_HB) that is connected to an antenna (7, 8); plural external terminals (TRX_LB, TX_LB, RX_LB, TERM_LB, TRX_HB, TX_HB, RX_1800, RX_1900) that are supplied with an RF signal; plural first high-frequency switches (101 to 104, 111 to 114) that are disposed between the antenna terminal and the external terminals; and plural control terminals (TRX_LBC, TX_LBC, RX_LBC, TERM_LBC, TRX_HBC, TX_HBC, RX_1800C, RX_1900C, TERM_HBC) that receive a control signal for switching ON and OFF states of the first high-frequency switches. Each first high-frequency switch includes plural first field-effect transistors (M1 to M6) that are disposed between the corresponding external terminal and the antenna terminal and that are connected in series, plural first resistors (Rg_1 to Rg_6) that are connected to the gate terminals of the first field-effect transistors, and a second resistor (Rc1) that is disposed between the corresponding control terminal and the first resistors. At least one terminal of the external terminals is a first terminal (TRX_LB, TRX_HB) that is supplied with an RF transmission signal and an RF reception signal of a frequency division duplex system. In the semiconductor device, the second resistor in the first high-frequency switch (101) disposed between the first terminal and the antenna terminal is configured so that linearity of current-voltage characteristics thereof is higher than linearity of current-voltage characteristics of the first resistor.

In Patent Document 1, attention is paid to intermodulation distortion occurring by unevenly supplying a leaking RF signal to the gate resistors of the high-frequency switch which is turned off. However, the intermodulation distortion also occurs in a high-frequency switch which is turned on. Particularly, when a high-frequency switch forming a signal path through which transmission and reception signals of an FDD system such as W-CDMA are transmitted is turned on, the coupling resistor of the high-frequency switch is supplied with a voltage having an amplitude larger than that of the gate resistors and thus has high sensitivity to distortion. Accordingly, in the semiconductor device according to [1], the second resistor in the first high-frequency switch disposed between the first terminal and the antenna terminal is configured so that linearity of current-voltage characteristics thereof is higher than linearity of current-voltage characteristics of the first resistor. As a result, it is possible to further reduce the intermodulation distortion occurring in the first high-frequency switch forming a signal path through which transmission and reception signals of an FDD system such as W-CDMA are transmitted.

[2] (A Resistive Element Having High Linearity is Used as a Coupling Resistor in a Switch of a Non-FDD Transmitting/Receiving Terminal)

In the semiconductor device according to [1], one external terminal of the plurality of external terminals is a second terminal (TX_LB, TX_HB) that is supplied with a transmission signal of a first communication system (for example, GSM system) other than the frequency division duplex system and another external terminal thereof is a third terminal (RX_LB, RX_1800, RX_1900) that is supplied with a reception signal of the first communication system. In the semiconductor device according to [1], the second resistor in the first high-frequency switch (103, 113) disposed between the second terminal and the antenna terminal and the second resistor in the first high-frequency switch (102, 112) disposed between the third terminal and the antenna terminal are configured so that linearity of current-voltage characteristics thereof is higher than linearity of current-voltage characteristics of the first resistor.

For example, when the first high-frequency switch between the first terminal and the antenna terminal is turned on and an RF signal is transmitted between the first terminal and the antenna terminal, the RF signal may leak to the first high-frequency switch which is turned off on the second terminal side or the first high-frequency switch which is turned off on the third terminal side. According to the above-mentioned configuration, even when the leaking RF signal (leaking RF signal) propagates to the second resistor in the first high-frequency switch on the second terminal side or the third terminal side, it is possible to suppress occurrence of the intermodulation distortion due to the second resistor.

[3] (A Resistive Element Having High Linearity is Used as a Coupling Resistor in a Switch of a Termination Terminal)

In the semiconductor device according to [1] or [2], one external terminal of the plurality of external terminals is a fourth terminal (TERM_LB, TERM_HB) that is connected to a termination circuit (22, 23), and the second resistor in the first high-frequency switch (104, 114) disposed between the fourth terminal and the antenna terminal is configured so that linearity of current-voltage characteristics thereof is higher than linearity of current-voltage characteristics of the first resistor.

According to this configuration, similarly to [2], even when an RF signal leaks to the first high-frequency switch which is turned off on the fourth terminal side, it is possible to reduce the intermodulation distortion due to the leaking RF signal by using the resistor having high linearity as the coupling resistor of the first high-frequency switch on the fourth terminal side.

[4] (A Resistive Element Having Low Sheet Resistance is Used as a Coupling Resistor)

In the semiconductor device according to any one of [1] to [3], the first resistor is formed of a first semiconductor layer (channel layer 604), and the second resistor is formed of a second semiconductor layer ($n^+$ layer 608) having resistivity per unit area lower than that of the first semiconductor layer.

In general, a resistive element using a resistive component of a semiconductor layer has a tendency that the larger the resistivity per unit area becomes, the worse the linearity of the current-voltage characteristics becomes. When a resistor formed of a semiconductor layer having small resistivity per unit area is used for all the resistors constituting the gate-control resistor of a high-frequency switch in order to reduce the intermodulation distortion, a larger chip area is required for realizing the desired resistance value and thus an increase in cost is caused. By employing the semiconductor device according to [4], it is possible to suppress an increase in chip area and to more effectively reduce the intermodulation distortion.

[5] (A Coupling Resistor is a Combined Resistor of a Resistive Element Having Low Sheet Resistance and a Resistive Element Having High Sheet Resistance)

In the semiconductor device according to [4], the first high-frequency switch further includes a third resistor (Rc2) that is connected in series to the second resistor, and the third resistor is formed of the first semiconductor layer.

By employing the semiconductor device according to [5], it is possible to further suppress an increase in chip area, compared with a case where the coupling resistor is formed of only the second semiconductor layer having low resistivity per unit area.

[6] (A Gate-Control Resistor is Disposed in the Vicinity of a Field-Effect Transistor)

In the semiconductor device according to any one of [1] to [5], a signal line (1103) connecting one end of a resistor circuit (Rx) including the first resistor and the second resistor and the gate terminal of the first field-effect transistor is shorter than a signal line (1104) connecting the other end of the resistor circuit and the control terminal.

Since interconnections and elements are condensed in a semiconductor device, there is a high possibility that an RF signal is coupled to another interconnection. When a field-effect transistor and a gate-control resistor are disposed apart from each other, the interconnection length therebetween increases, the RF signal propagates as noise to the gate of the field-effect transistor by coupling, and the characteristics of the field-effect transistor may degrade. However, by employing the semiconductor device according to [6], it is possible to effectively prevent coupling.

[7] (A Resistor Having High Linearity is Used as a Coupling Resistor in a Second High-Frequency Switch Between a Transceiving Terminal and a Ground Path)

The semiconductor device according to any one of [1] to [6] further includes a second high-frequency switch (105, 115) that forms a signal path between the first terminal and a ground node (GND_RXLB, GND_TRXHB) when the plurality of field-effect transistors of the first high-frequency switch disposed between the antenna terminal and the first terminal are turned off. The second high-frequency switch includes a plurality of second field-effect transistors (Ms) that are disposed between the first terminal and the ground node and that are connected in series, a plurality of fourth resistors (Rgs_1 to Rgs_4) that are connected to the gate terminals of the plurality of second field-effect transistors, and a fifth resistor (Rcs1) that is disposed between the ground node and the fourth resistors. In the semiconductor device according to [7], the fifth resistor is configured so that the linearity of current-voltage characteristics thereof is higher than the linearity of current-voltage characteristics of the fourth resistor.

According to this configuration, similarly to [2], even when an RF signal leaks to the second high-frequency switch, it is possible to reduce the intermodulation distortion due to the leaking RF signal by using the resistor having high linearity as the coupling resistor of the second high-frequency switch.

[8] (A Resistive Element Having Low Sheet Resistance is Used as the Coupling Resistor in the Second High-Frequency Switch)

In the semiconductor device according to [7], the fourth resistor is formed of a first semiconductor layer (channel layer 604), and the fifth resistor is formed of a second semiconductor layer ($n^+$ layer 608) having resistivity per unit area lower than that of the first semiconductor layer.

According to this configuration, similarly to [4], it is possible to suppress an increase in chip area and to more effectively reduce the intermodulation distortion.

[9] (A Coupling Resistor in the Second High-Frequency Switch is a Combined Resistor of a Resistive Element Having Low Sheet Resistance and a Resistive Element Having High Sheet Resistance)

In the semiconductor device according to [8], the second high-frequency switch further includes a sixth resistor (Rcs2) that is connected in series to the fifth resistor, and the sixth resistor is formed of the first semiconductor layer.

According to this configuration, similarly to [5], it is possible to further suppress a chip area.

[10] (High-Frequency Module)

A high-frequency module (30) according to a representative embodiment of the present invention includes: the semiconductor device (1) according to any one of [1] to [9]; and a control semiconductor device (2) that generates the control signal.

[11] (Connection Relationship in the High-Frequency Module)

In the high-frequency module according to [10], the control semiconductor device includes a plurality of output terminals (CL1 to CL5, CH1 to CH7) that output the control signal and that are arranged along one side of the corresponding semiconductor device, the semiconductor device according to [1] includes the plurality of control terminals that are arranged along one side of the corresponding semiconductor device. In the high-frequency module, the output terminals and the control terminals are arranged to face each other and are connected to each other by bonding wires.

[12] (A Resistor Having High Linearity is Used as a Coupling Resistor in an Antenna Switch of an FDD Transceiving Terminal)

A semiconductor device (1) according to a representative embodiment of the present invention includes: an antenna terminal (ANT_LB) that is connected to an antenna (7, 8); a transceiving terminal (TRX_LB, TRX_HB) that is supplied with an RF transmission signal and an RF reception signal of a frequency division duplex system; and a first high-frequency switch (101) that is disposed between the antenna terminal and the transceiving terminal. The first high-frequency switch includes a plurality of field-effect transistors (Mt (M1 to M6)) that are connected in series, and a resistor circuit (Rg, Rc1) that receives a control signal for controlling ON and OFF states of the plurality of field-effect transistors and that drives the plurality of field-effect transistors. The resistor circuit includes a plurality of first resistors (Rg (Rg_1 to Rg_6)) that are connected to the gate terminals of the plurality of field-effect transistors, and a second resistor (Rc1) that supplies the control signal supplied to one end thereof to the first resistors connected to the other end thereof. The second resistor is configured so that linearity of current-voltage characteristics thereof is higher than linearity of current-voltage characteristics of the first resistor.

According to this configuration, similarly to [1], it is possible to further reduce the intermodulation distortion occurring in the first high-frequency switch forming a signal path through which transmission and reception signals of an FDD system such as W-CDMA are transmitted.

[13] (A Resistive Element Having Low Sheet Resistance is Used as a Coupling Resistor)

In the semiconductor device according to [12], the first resistor is formed of a first semiconductor layer (channel layer 604), and the second resistor is formed of a second semiconductor layer ($n^+$ layer 608) having resistivity per unit area lower than that of the first semiconductor layer.

According to this configuration, similarly to [4], it is possible to suppress an increase in chip area and to more effectively reduce the intermodulation distortion.

[14] (A Coupling Resistor is a Combined Resistor of a Resistive Element Having Low Sheet Resistance and a Resistive Element Having High Sheet Resistance)

In the semiconductor device according to [13], the first high-frequency switch further includes a third resistor (Rc2) that is connected in series to the second resistor, and the third resistor is formed of the first semiconductor layer.

According to this configuration, similarly to [5], it is possible to further suppress a chip area.

2. Details of Embodiments

The embodiments will be described below in more detail.

<Configuration of Mobile Phone>

FIG. 1 is a block diagram illustrating a mobile phone having a semiconductor device including an antenna switch according to this embodiment. In the drawing, functional blocks for transmitting/receiving a sound signal are representatively illustrated out of plural functional blocks for realizing functions of a mobile phone. In the drawing, the mobile phone 100 can be switched, for example, between two communication systems. Although not particularly limited, the mobile phone 100 can transmit and receive a signal of two communication systems of W-CDMA and GSM and can transmit and receive signals of two frequency bands of a high band and a low band in each communication system.

The mobile phone 100 includes, for example, an RF system unit RF_SYS for transmitting and receiving an RF signal, a baseband unit (BB) 4, a microphone (MIC) 5, a speaker (SPKR) 6, and antennas 7 and 8 as the functional blocks for transmitting/receiving a sound signal.

The baseband unit 4 demodulates a baseband signal supplied from an RFIC 3 in accordance with a target communication system (W-CDMA or GSM) and acquires necessary information included in an RF signal received from the antennas 7 and 8. For example, the baseband unit 4 performs reproduction of sound by demodulating a baseband signal, extracting sound data, and outputting the extracted sound data to the speaker 6. The baseband unit 4 generates a baseband transmission signal in accordance with a target communication system. For example, the baseband unit modulates sound data converted into an electrical signal by the microphone 5 in accordance with a target communication system and generates a baseband transmission signal. The generated baseband transmission signal is input to the RFIC 3. The baseband unit 4 outputs a selection signal SL indicating what communication system is used to transmit a signal or what communication system is used to receive a signal when transmitting or receiving a signal.

The RF system unit RF_SYS includes an RF module (RF_MDL) 30 including an RFIC 3, a control unit 201, high-frequency power amplifiers (HPA) 202 and 204, a power control unit (APC) 203, and an antenna switch 1, various band-pass filters 13, 14, 17, 18, and 19, and a high-frequency power amplifier (HPA) 15. In the RF module 30, although not particularly limited, the control unit 201, the high-frequency power amplifiers (HPA) 202 and 204, and the power control unit 203 are formed as a control IC (CNT_IC) 2 on a semiconductor substrate of monocrystalline silicon or the like using a known CMOS integrated circuit manufacturing technique.

The control unit 201 generates a control signal SC in response to the selection signal SL output from the baseband unit 4. The control signal SC includes plural signals for controlling ON and OFF states for each high-frequency switch of the antenna switch 1. The control signals are input to the control terminals of the switch circuits 10 and 11, respectively, as described later.

At the time of receiving a signal, the RFIC 3 receives an RF reception signal received by the antennas 7 and 8 via the antenna switch 1 or the like and generates a baseband reception signal. The generated baseband reception signal is output to the baseband unit 4. On the other hand, at the time of transmitting a signal, the RFIC 3 receives a baseband transmission signal generated from the baseband unit 4 and generates an RF transmission signal corresponding to a target communication system. For example, the RFIC 3 generates an RF transmission signal (high band/low band) of a GSM system or an RF transmission signal (high band/low band) of a W-CDMA system.

The RF transmission signal of a GSM system generated by the RFIC 3 is input to the high-frequency power amplifiers 202 and 204. The high-frequency power amplifiers 202 and 204 are power amplifiers for amplifying an RF transmission signal and amplify and output the input RF transmission signal. For example, the high-frequency power amplifier 202 amplifies and outputs a low-band RF transmission signal of a GSM system and the high-frequency power amplifier 204 amplifies and outputs a high-band RF transmission signal of a GSM system. The power control unit 203 adjusts gains of the high-frequency power amplifiers 202 and 204. For example, the power control unit 203 determines the gains of the high-frequency power amplifiers 202 and 204 on the basis of a signal, which is output from the baseband unit 4, indicating a gain. Then, the power control unit adjusts the high-frequency power amplifiers 202 and 204 to have the target gains. The output RF transmission signal is input to the antenna switch 1. For example, the low-band RF transmission signal of a GSM system is input to a receiving terminal RX_LB of the antenna switch 1. The RF transmission signal is transmitted from the antenna 7 via the antenna switch 1. The high-band RF transmission signal of a GSM system is input to a receiving terminal RX_HB of the antenna switch 1. The RF transmission signal is transmitted from the antenna 8 via the antenna switch 1. Although details thereof will not described later, the antenna switch 1 includes plural high-frequency switches and forms a signal path between the antennas 7 and 8 and plural terminals (RX_LB, TX_LB, TRX_LB, TERM_LB, RX_1900, RX_1800, TX_HB, TRX_HB, and TERM_HB) by controlling the ON and OFF states of the high-frequency switches. What signal path to form is determined by the control signal SC output from the control unit 201.

The low-band RF reception signal of a GSM system received by the antenna 7 is input to the band-pass filter 19 via the antenna switch 1, unnecessary frequency components are removed therefrom, and the resultant signal is input to the RFIC 3. On the other hand, the high-band RF reception signal of a GSM system received by the antenna 8 is input to the band-pass filters 13 and 14 via the antenna switch 1, unnecessary frequency components are removed therefrom, and the resultant signal is input to the RFIC 3. For example, a 1900 MHz RF reception signal of a GSM system is input to the band-pass filter 13, and a 1800 MHz RF reception signal of a GSM system is input to the band-pass filter 14.

As described above, in the W-CDMA system, transmission and reception of signals are simultaneously performed. In the RF system unit RF_SYS illustrated in FIG. 1, a low-band RF reception signal and a low-band RF transmission signal of a W-CDMA system are simultaneously transmitted through the same signal path between the antenna 7 and the band-pass filter 17. For example, the low-band RF reception signal of a W-CDMA system received by the antenna 7 is transmitted to the signal path of a node TRX_LB via the antenna switch 1 and is input to the band-pass filter 17. Unnecessary frequency components are removed therefrom by the band-pass filter 17 and the resultant signal is input to the RFIC 3. On the other hand, the low-band RF transmission signal of a W-CDMA system generated by the RFIC 3 is amplified by the high-frequency power amplifier 15 and is then input to the band-pass filter 17. Then, unnecessary frequency components are removed therefrom by the band-pass filter 17 and the resultant signal is transmitted to the node TRX_LB and is transmitted from the antenna 7 via the antenna switch 1.

Similarly, a high-band RF reception signal and a high-band RF transmission signal of a W-CDMA system are simultaneously transmitted through the same signal path between the antenna 8 and the band-pass filter 18. For example, the high-band RF reception signal of a W-CDMA system received by the antenna 8 is transmitted to the signal path of a node TRX_HB via the antenna switch 1 and is input to the band-pass filter 18. Unnecessary frequency components are removed therefrom by the band-pass filter 18 and the resultant signal is input to the RFIC 3. On the other hand, the high-band RF transmission signal of a W-CDMA system generated by the RFIC 3 is amplified by the high-frequency power amplifier 15 and is then input to the band-pass filter 18. Then, unnecessary frequency components are removed therefrom by the band-pass filter 18 and the resultant signal is transmitted to the node TRX_HB and is transmitted from the antenna 8 via the antenna switch 1.

<Configuration of Antenna Switch>

The antenna switch 1 will be described below in detail. Although not limiting, the antenna switch 1 is formed on a semiconductor substrate of a compound such as GaAs having high electron mobility. As illustrated in FIG. 1, the antenna switch 1 includes a low-band switch circuit 10 and a high-band switch circuit 11. The low-band switch circuit 10 is an antenna switch of a single pole four throw (SP4T) type and the high-band switch circuit 11 is an antenna switch of a single pole five throw (SP5T) type.

<Circuit Configuration of Low-band Switch Circuit 10>

First, the low-band switch circuit 10 of an SP4T type will be described below.

Figure 2:
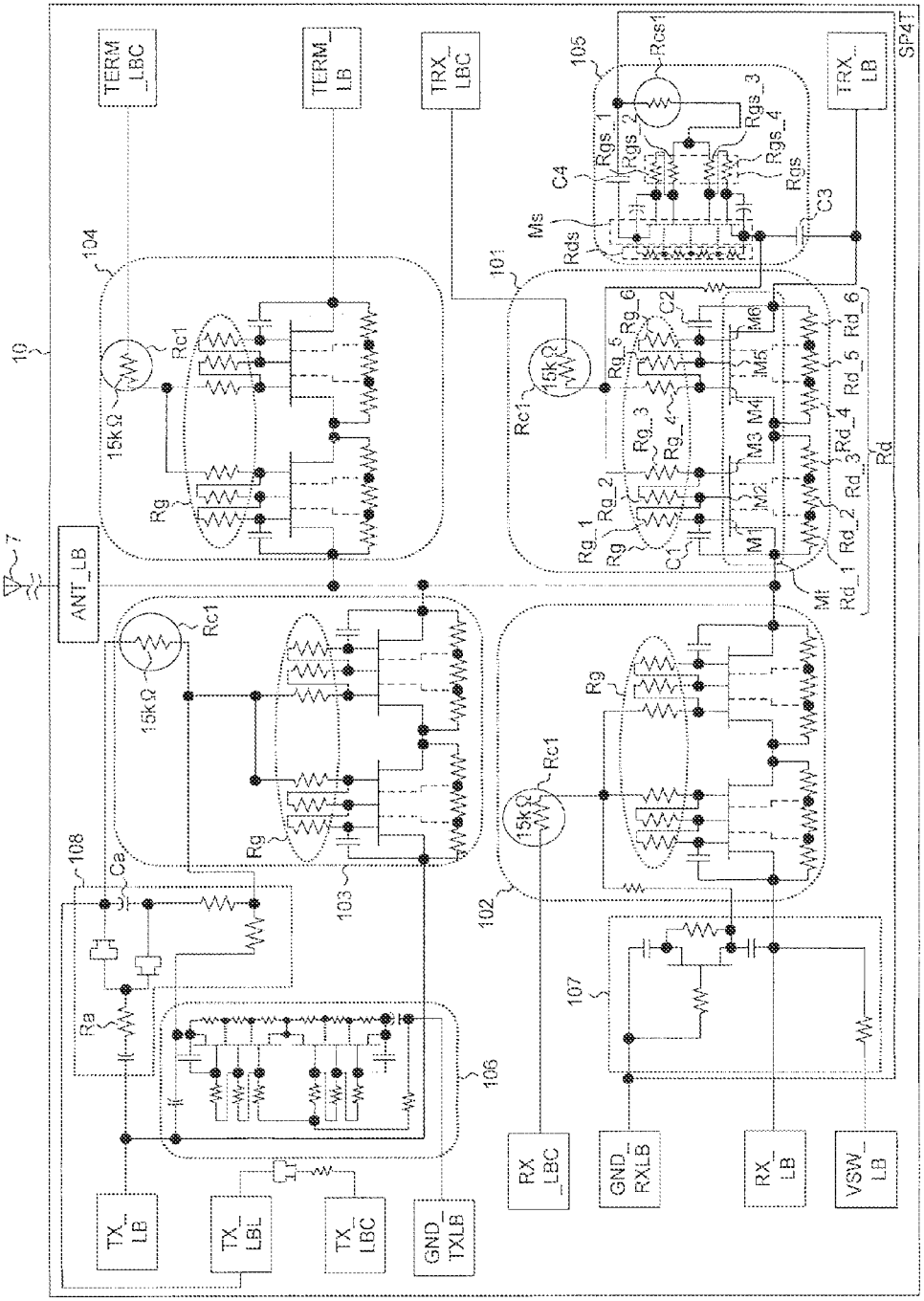
FIG. 2 is a circuit diagram illustrating an example of a circuit configuration of a low-band switch circuit 10.

FIG. 2 is a circuit diagram illustrating an example of a circuit configuration of the low-band switch circuit 10. The switch circuit 10 achieves necessary isolation by forming a signal path between any one of a receiving terminal RX_LB, a transmitting terminal TX_LB, a transceiving terminal TRX_LB, and a termination terminal TERM_LB and an antenna terminal ANT_LB, and setting impedance of the signal paths other than the formed signal path to a very high value.

The switch circuit 10 includes four first high-frequency switches 101 to 104, three second high-frequency switches 105 to 107, a gate control circuit 108, and plural terminals. The plural terminals include, for example, an antenna terminal ANT_LB, a receiving terminal RX_LB, a transmitting terminal TX_LB, a transceiving terminal TRX_LB, a termination terminal TERM_LB, control terminals TX_LBC, RX_LBC, TRX_LBC, TERM_LBC, and VSW_LB, and power source terminals GND_TXLB and GND_RXLB. Reference signs denoting the plural terminals in the switch circuit 10 represent nodes connected to the corresponding terminals in addition to the corresponding terminals.

The antenna terminal ANT_LB is connected to the antenna 7. The transceiving terminal TRX_LB is a terminal that is supplied with a low-band RF transmission signal and a low-band RF reception signal of a W-CDMA system and is connected to the band-pass filter 17. The first high-frequency switch 101 is disposed between the transceiving terminal TRX_LB and the antenna terminal ANT_LB. The ON and OFF states of the first high-frequency switch 101 are controlled by the control signal supplied to the control terminal TRX_LBC out of the control signals SC. The second high-frequency switch 105 is disposed between the transceiving terminal TRX_LB and the power source terminal GND_RXLB. Similarly to the first high-frequency switch 101, the ON and OFF states of the second high-frequency switch 105 are controlled by the control signal supplied to the control terminal TRX_LBC out of the control signals SC. For example, the second high-frequency switch 105 forms a signal path between the transceiving terminal TRX_LB and the power source terminal GND_RXLB connected to the ground potential in a period in which the first high-frequency switch 101 is turned off. Accordingly, the impedance of the transceiving terminal TRX_LB when the first high-frequency switch 101 is turned off is lowered.

The transmitting terminal TX_LB is a terminal that is supplied with a low-band RF transmission signal of a GSM system. The first high-frequency switch 103 is disposed between the transmitting terminal TX_LB and the antenna terminal ANT_LB. The ON and OFF states of the first high-frequency switch 103 are controlled by the control signal supplied to the control terminal TX_LBC out of the control signals SC. Specifically, the gate control circuit 108 charges a capacitor Ca using the control signal supplied to the control terminal TX_LBC and the RF transmission signal supplied to the transmitting terminal TX_LB. The first high-frequency switch 103 is driven with the output voltage corresponding to the sum of the charged voltage of the capacitor Ca and the voltage of the control signal supplied to the control terminal TX_LBC. The second high-frequency switch 106 is disposed between the transmitting terminal TX_LB and the power source terminal GND_TXLB. The ON and OFF states of the second high-frequency switch 106 are controlled by the control signal supplied to the control terminal TRX_LBC. For example, the second high-frequency switch 106 forms a signal path between the transmitting terminal TX_LB and the power source terminal GND_TXLB connected to the ground potential in a period in which the first high-frequency switch 103 is turned off. Accordingly, the impedance of the transmitting terminal TX_LB when the first high-frequency switch 103 is turned off is lowered.

The receiving terminal RX_LB is connected to an input terminal of the band-pass filter 19. The first high-frequency switch 102 is disposed between the receiving terminal RX_LB and the antenna terminal ANT_LB. The ON and OFF states of the first high-frequency switch 102 are controlled by the control signal supplied to the control terminal RX_LBC out of the control signals SC. By turning on the first high-frequency switch 102, the low-band RF reception signal of a GSM system received by the antenna 7 is supplied to the receiving terminal RX_LB. The second high-frequency switch 107 is disposed between the receiving terminal RX_LB and the power source terminal GND_RXLB. The ON and OFF states of the second high-frequency switch 107 are controlled by the control signal supplied to the control terminal RX_LBC. For example, the second high-frequency switch 107 forms a signal path between the receiving terminal RX_LB and the power source terminal GND_TXLB connected to the ground potential in a period in which the first high-frequency switch 102 is turned off. Accordingly, the impedance of the receiving terminal RX_LB when the first high-frequency switch 102 is turned off is lowered.

The termination terminal TERM_LB is a terminal that is connected to an externally-added resistor 22 for terminating the node connected to the antenna terminal ANT_LB. The first high-frequency switch 104 is disposed between the termination terminal TERM_LB and the antenna terminal ANT_LB. The ON and OFF states of the first high-frequency switch 104 are controlled by the control signal supplied to the control terminal TERM_LBC out of the control signals SC. For example, when transmission and reception of a high-band RF signal is performed in a period in which transmission and reception of a low-band RF signal is stopped, it is possible to reduce reflection of a high-band RF signal at the node by turning on the first high-frequency switch 104 to terminate the node connected to the antenna terminal ANT_LB.

The circuit configurations of the first high-frequency switches 101 to 104 will be described below in detail. The basic circuit configurations of the first high-frequency switches 101 to 104 are considered to be the same and thus the first high-frequency switch 101 will be representatively described herein. As illustrated in FIG. 2, the first high-frequency switch 101 includes field-effect transistor Mt disposed between the antenna terminal ANT_LB and the transceiving terminal TRX_LB. The field-effect transistors Mt are HEMTs having a multi-gate structure in which plural HEMTs of a heterojunction structure are connected in series. The drawing illustrates a configuration example in which six HEMTs (M1 to M6) are connected in series as the field-effect transistors Mt. By using the HEMTs having a multi-gate structure, it is possible to increase a voltage which can be treated by the first high-frequency switch 101 and to guarantee low on-resistance so as to reduce loss in the field-effect transistors Mt. Resistors Rd_1 to Rd_6 (generically referenced by "Rd") having a relatively high resistance value (for example, several tens of kΩ) are connected between the drain and the source of each of the transistors M1 to M6. Accordingly, when the field-effect transistors Mt are turned on, the drain voltage and the source voltage can be made to be equal to each other. A capacitor C1 is connected between the drain and the source of the transistor M1 and a capacitor C2 is connected between the source and the gate of the transistor M6.

The gates of the transistors M1 to M6 are connected to the control terminal TRX_LBC via the gate-control resistor including six resistors Rg_1 to Rg_6 connected to the gates and one resistor Rc1. In the below description, the resistors Rg_1 to Rg_6 connected to the gates of the transistors M1 to M6 in the gate-control resistor are generically referred to as gate resistors Rg and the resistor Rc1 is referred to as a coupling resistor Rc1.

The specific connections of the transistors M1 to M6, the gate resistors Rg, and the coupling resistor Rc1 are as follows. For example, one end of the resistor Rg_1 is connected to the gate of the transistor M1 and the other end thereof is connected to one end of the resistor Rg_2 and the gate of the transistor M2. One end of the resistor Rg_2 is connected to the gate of the transistor M2 and the other end thereof is connected to one end of the resistor Rg_3 and the gate of the transistor M3. One end of the resistor Rg_3 is connected to the gate of the transistor M3 and the other end thereof is connected to one end of the resistor Rc1. One end of the resistor Rg_6 is connected to the gate of the transistor M6 and the other end thereof is connected to one end of the resistor Rg_5 and the gate of the transistor M5. One end of the resistor Rg_5 is connected to the gate of the transistor M5 and the other end thereof is connected to one end of the resistor Rg_4 and the gate of the transistor M4. One end of the resistor Rg_4 is connected to the gate of the transistor M4 and the other end of the resistor Rg_4 is connected to the other end of the resistor Rg_3 and one end of the resistor Rc1. The other end of the resistor Rc1 is connected to the control terminal TRX_LBC.

By inputting the signal supplied to the control terminal TRX_LBC to the gate of the field-effect transistors Mt via the gate-control resistor connected as described above, a substantially uniform gate drive voltage is applied to the transistors M1 to M6. By setting the resistance values of the gate resistors Rg and the coupling resistor Rc1 to relatively high values, it is possible to reduce loss due to leakage of an RF signal to the control terminal TRX_LBC.

A channel layer or a cap layer formed on a semiconductor substrate formed of compound semiconductor GaAs, for example, using a metal organic chemical vapor deposition (MOCVD) method can be used as the gate-control resistor in the antenna switch 1. Hereinafter, the resistor using the channel layer is referred to as a channel resistor Rch and a resistor using the cap layer ($n^+$ layer) is referred to as an $n^+$ resistor Rnp.

Figure 3:
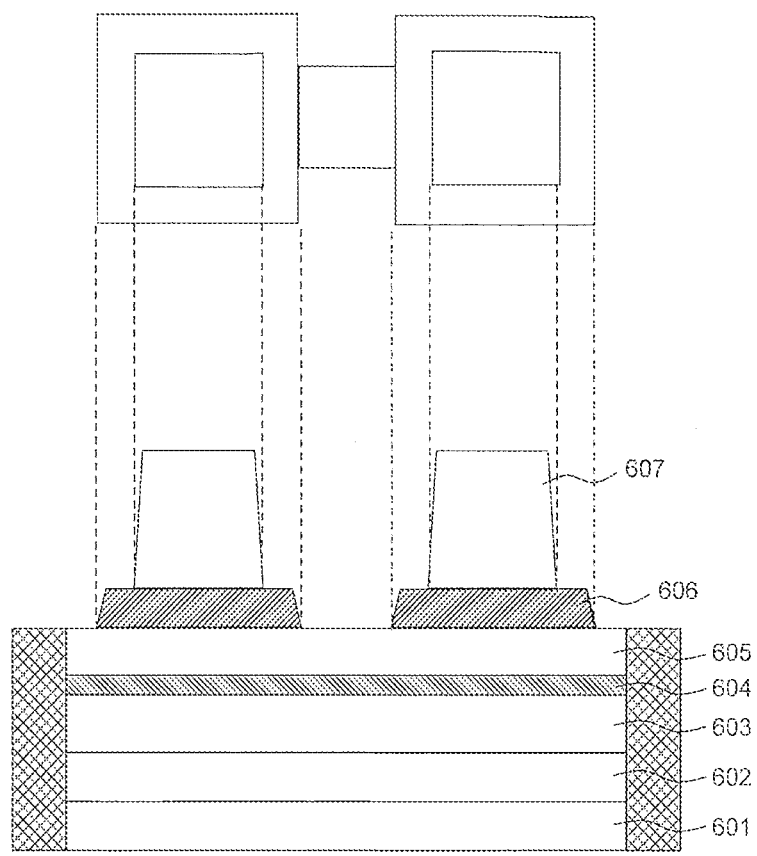
FIG. 3 is an explanatory diagram illustrating an example of a cross-sectional structure of a channel resistor Rch.

FIG. 3 is an explanatory diagram illustrating an example of a cross-sectional structure of a channel resistor Rch. As illustrated in the drawing, a buffer layer 602, an electron supply layer 603, a channel layer 604, an electron supply layer 605, a cap layer ($n^+$ layer) 606, and an electrode 607 formed of an ohmic layer are sequentially made to epitaxially grow on a semiconductor substrate 601 formed of compound semiconductor GaAs, for example, using the MOCVD method. The channel resistor Rch has the channel layer 604 as a major resistive component.

Figure 4:
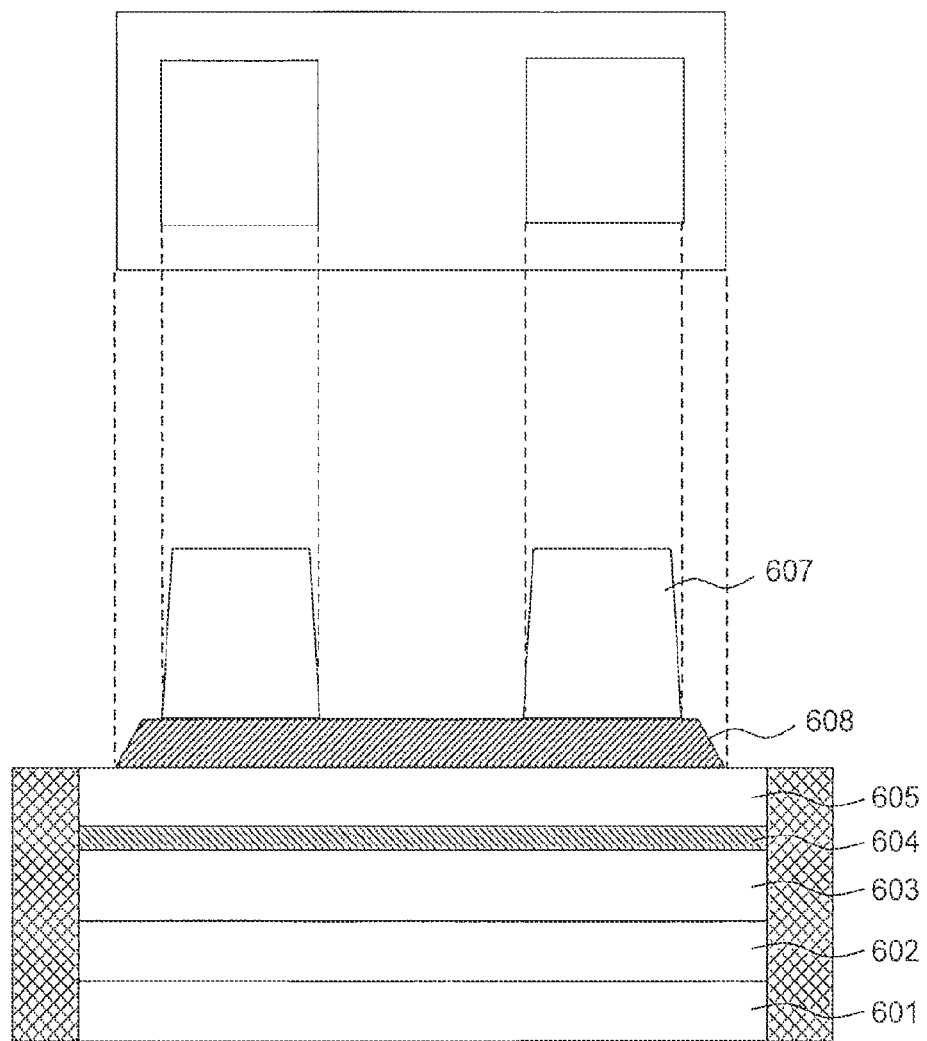
FIG. 4 is an explanatory diagram illustrating an example of a cross-sectional structure of an $n^+$ resistor Rnp.

FIG. 4 is an explanatory diagram illustrating an example of a cross-sectional structure of a $n^+$ layer Rnp. Similarly to FIG. 3, a buffer layer 602, an electron supply layer 603, a channel layer 604, an electron supply layer 605, a cap layer ($n^+$ layer) 608, and an electrode 607 formed of an ohmic layer are sequentially made to epitaxially grow on a semiconductor substrate 601. The n$^+$ resistor Rnp has the cap layer (n$^+$ layer) 608 as a major resistive component. The cap layer 608 is formed of an n+ type GaAs layer and is doped with impurity ions (for example, silicon ions) having an n-type conductivity type. The n$^+$ resistor Rnp has resistivity per unit area lower than that of the channel resistor Rch. Accordingly, when a resistor having a predetermined resistance value is embodied by the n$^+$ resistor Rnp, the n$^+$ resistor Rnp is generally larger in layout area than the channel resistor Rch. On the other hand, n$^+$ resistor Rnp has linearity higher than that of the channel resistor Rch in current-voltage characteristics.

Figure 5:
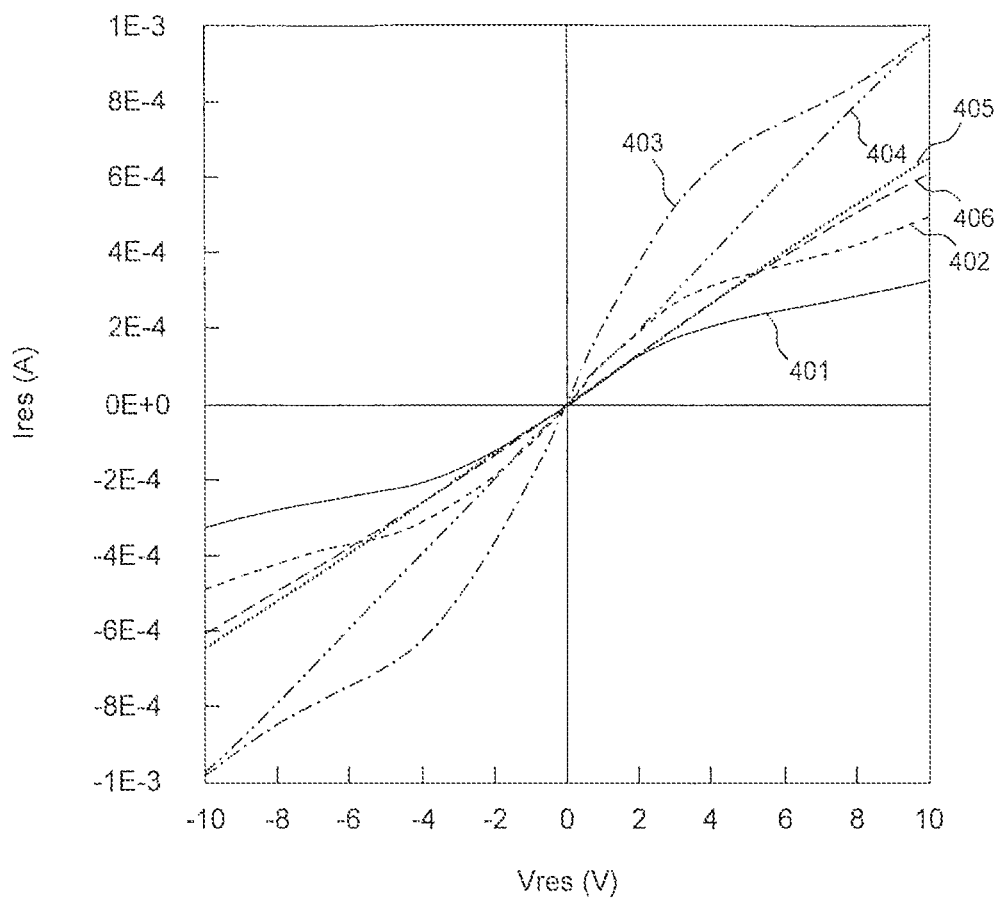
FIG. 5 is an explanatory diagram illustrating current-voltage characteristics (I-V characteristics) of a channel resistor Rch and an $n^+$ resistor Rnp.

FIG. 5 illustrates current-voltage characteristics (I-V characteristics) of a channel resistor Rch and an n$^+$ resistor Rnp. In the drawing, the vertical axis represents a current Ires flowing in the resistor and the horizontal axis represents a voltage Vres across the resistor. Reference numeral 401 denotes a characteristic of a channel resistor Rch of 15 kΩ, reference numeral 402 denotes a characteristic of a channel resistor Rch of 10 kΩ, and reference numeral 403 denotes a characteristic of a channel resistor Rch of 5 kΩ. Reference numeral 404 denotes a characteristic of an n$^+$ resistor Rnp of 10 kΩ, reference numeral 405 denotes a characteristic of an n$^+$ resistor Rnp of 15 kΩ, and reference numeral 406 denotes a characteristic of a combined resistor in which an n$^+$ resistor Rnp of 10 kΩ and a channel resistor Rch of 5 kΩ are connected in series.

Figure 6:
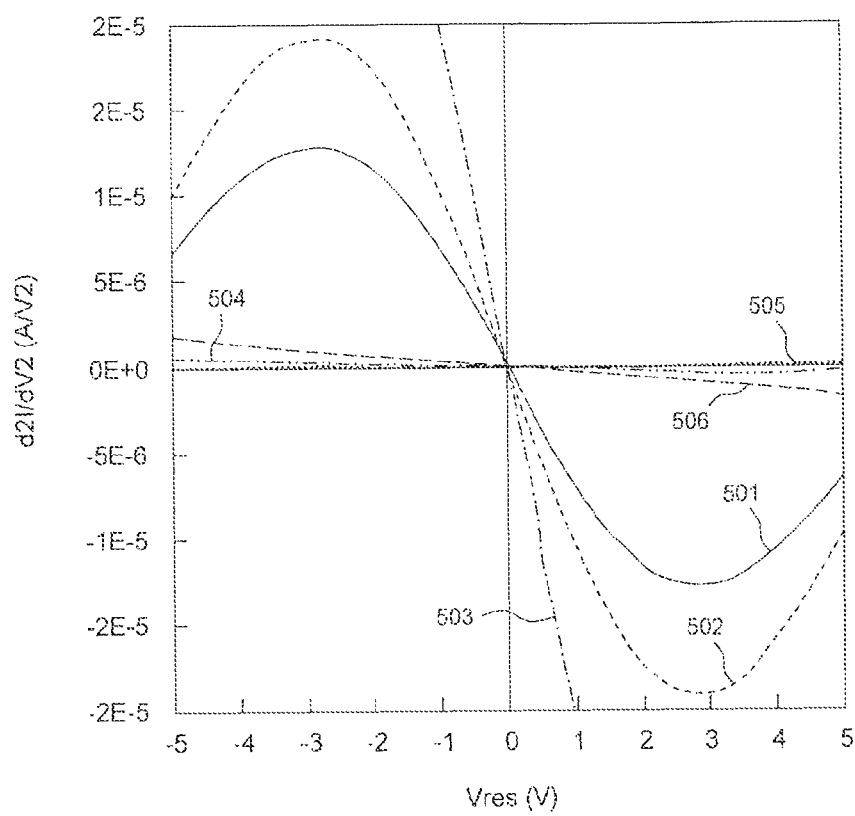
FIG. 6 is an explanatory diagram illustrating secondary differentiation characteristics of the current-voltage characteristics (I-V characteristics) of a channel resistor Rch and an $n^+$ resistor Rnp.

FIG. 6 is an explanatory diagram illustrating secondary differentiation characteristics of the current-voltage characteristics of a channel resistor Rch and an n$^+$ resistor Rnp. In the drawing, the vertical axis represents secondary differentiation d2I/dV2 of a current flowing in the resistor and the horizontal axis represents a voltage Vres across the resistor. Reference numeral 501 denotes a characteristic of a channel resistor Rch of 15 kΩ, reference numeral 502 denotes a characteristic of a channel resistor Rch of 10 kΩ, and reference numeral 503 denotes a characteristic of a channel resistor Rch of 5 kΩ. Reference numeral 504 denotes a characteristic of an n$^+$ resistor Rnp of 10 kΩ, reference numeral 505 denotes a characteristic of an n$^+$ resistor Rnp of 15 kΩ, and reference numeral 506 denotes a characteristic of a combined resistor in which an n$^+$ resistor Rnp of 10 kΩ and a channel resistor Rch of 5 kΩ are connected in series. It can be understood from FIGS. 5 and 6 that the n$^+$ resistor Rnp is higher in linearity than the channel resistor Rch.

As described above, use of a resistor having low linearity as the gate-control resistor in the high-frequency switch causes occurrence of the intermodulation distortion.

Figure 7:
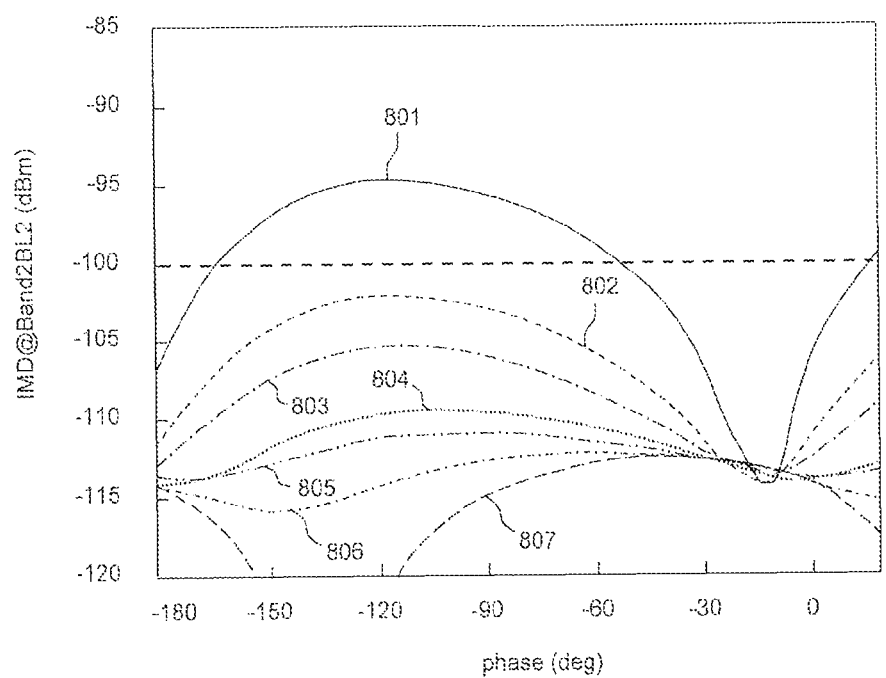
FIG. 7 is an explanatory diagram illustrating intermodulation distortion characteristics of an antenna switch 1.

FIG. 7 illustrates characteristics of intermodulation distortion of the switch circuit 10. The drawing illustrates characteristics of the intermodulation distortion when an RF transmission signal and an RF reception signal are simultaneously input to a signal path between the antenna terminal ANT_LB and the transceiving terminal TRX_LB in the antenna switch 1. In the drawing, the vertical axis represents the magnitude of the intermodulation distortion and the horizontal axis represents the phase difference between the RF transmission signal and the RF reception signal input to the signal path between the antenna terminal ANT_LB and the transceiving terminal TRX_LB.

Characteristics denoted by reference numerals 801 to 807 are characteristics of the intermodulation distortion when the applicable condition of the n$^+$ resistor Rnp and the channel resistor Rch in the gate-control resistor of the switch circuit 10 are changed. For example, reference numeral 801 denotes a characteristic when all the gate-control resistors in the first high-frequency switches 101 to 104 and the second high-frequency switch 105 are formed of the channel resistor Rch. Reference numeral 802 denotes a characteristic when the coupling resistor Rc in the first high-frequency switch 101 is formed of the n$^+$ resistor Rnp and the other resistors are formed of the channel resistor Rch. Reference numeral 803 denotes a characteristic when the coupling resistors Rc in the first high-frequency switches 101 to 104 and the second high-frequency switch 105 are formed of the n$^+$ resistor Rnp and the other resistors are formed of the channel resistor Rch. Reference numeral 804 denotes a characteristic when the coupling resistors Rc in the first high-frequency switches 101 to 104 are formed of the n$^+$ resistor Rnp and all the resistors in the second high-frequency switch 105 are formed of the channel resistor Rch. Reference numeral 805 denotes a characteristic when the coupling resistors Rc and the gate resistors Rg (Rg_1 to Rg_6) in the first high-frequency switches 101 to 104 are formed of the n$^+$ resistor Rnp. Reference numeral 806 denotes a characteristic when the coupling resistors Rc and the gate resistors Rg (Rg_1 to Rg_6) in the first high-frequency switches 101 to 104 and the coupling resistor Rcs and the gate resistors Rgs (Rgs_1 to Rgs_4) in the second high-frequency switch 105 are formed of the n$^+$ resistor Rnp. Reference numeral 807 denotes a characteristic when all the resistors are formed of an ideal resistor. It can be understood from FIG. 7 that the higher the ratio at which the n$^+$ resistor Rnp is used for the resistors in the switch circuit 10 becomes, the smaller the intermodulation distortion becomes.

Figure 8:
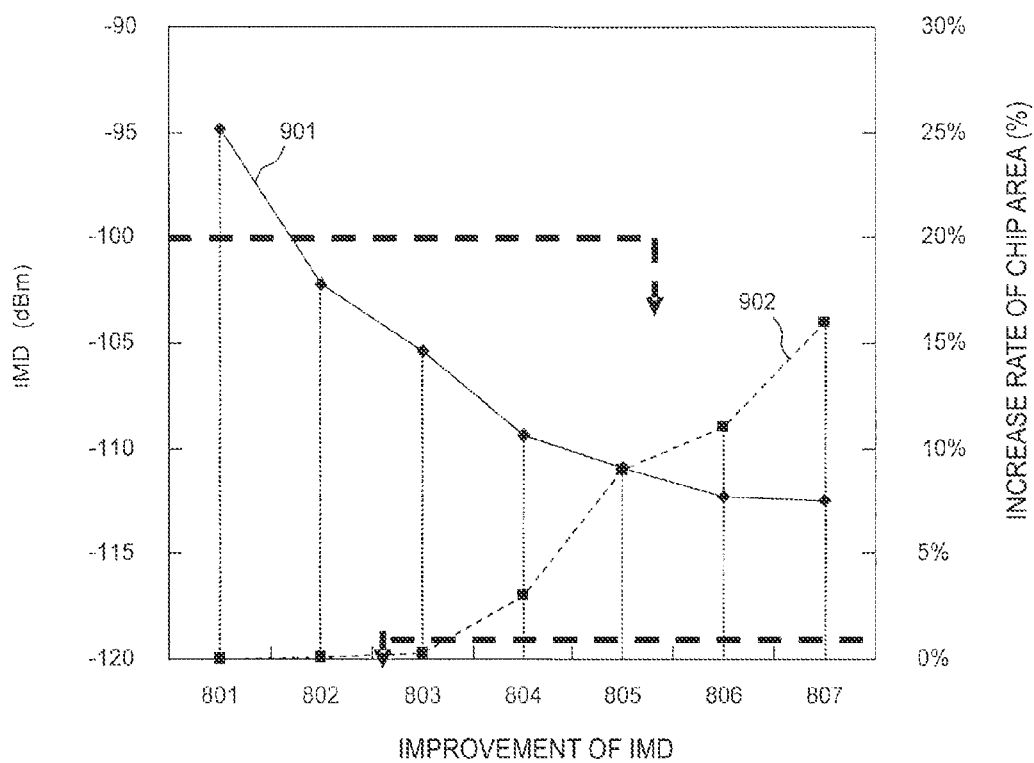
FIG. 8 is an explanatory diagram illustrating intermodulation distortion and an increase rate in chip area under conditions illustrated in FIG. 7.

FIG. 8 is an explanatory diagram illustrating examples of intermodulation distortion and an increase rate in chip area under conditions illustrated in FIG. 7. Reference numeral 901 denotes the intermodulation distortion under the conditions 801 to 807 illustrated in FIG. 7. Reference numeral 902 denotes the increase rates in chip area under the conditions 801 to 807 illustrated in FIG. 7. As illustrated in FIG. 8, the higher the ratio at which the n$^+$ resistor Rnp is used for the resistors in the switch circuit 10 becomes, the smaller the intermodulation distortion becomes but the larger the chip area becomes. That is, it can be understood that there is a trade-off relationship between the intermodulation distortion and the chip area.

On the basis of the results of FIGS. 7 and 8, it is preferable that the resistive elements to be used for the gate-control resistor of the high-frequency switch be selected depending on the intermodulation distortion characteristics required for the antenna switch and the allowable chip area. As described above, a voltage of large amplitude is applied to the gate-control resistor receiving the control signal from the control terminal TRX_LBC. Accordingly, when the linearity of the current-voltage characteristics of the gate-control resistor is low, the intermodulation distortion occurs. Particularly, since a voltage of amplitude larger than that of the gate resistors Rg is applied to the coupling resistor Rc1 in the gate-control resistor, the sensitivity to distortion is high. Therefore, as an appropriate method of reducing the intermodulation distortion while suppressing an increase in the chip area, a method of using a resistor having high linearity as the coupling resistor of the gate-control resistor can be considered. For example, the n$^+$ resistor Rnp is used for the coupling resistor Rc1 in the first high-frequency switch 101 for forming a signal path for transmitting RF transmission and reception signals of a W-CDMA system and the channel resistor Rch is used for the other resistors. According to this configuration, when a low-band RF transmission signal of a W-CDMA system is transmitted and received, it is possible to greatly reduce the intermodulation distortion occurring in the signal path between the antenna terminal ANT_LB and the transceiving terminal TRX_LB and to suppress an increase in the chip area. This can be understood from FIG. 8. For example, as indicated by characteristics 901 and 902 illustrated in FIG. 8, under the condition 802 in which the $n^+$ resistor Rnp is used for the coupling resistor Rc1 in the first high-frequency switch 101 and the channel resistor Rch is used for the other resistors, the intermodulation distortion characteristics are greatly improved and the increase in the chip area is suppressed, compared with the condition 801 in which the channel resistor Rch is used for all the gate-control resistors in the first high-frequency switches 101 to 104 and the second high-frequency switch 105.

In order to improve the intermodulation distortion characteristics, the $n^+$ resistor Rnp can be used for the coupling resistors Rc in the first high-frequency switches 102 to 104 in addition to the coupling resistor Rc1 in the first high-frequency switch 101. According to this configuration, when a low-band RF transmission signal of a W-CDMA system is transmitted and received, it is possible to reduce the intermodulation distortion occurring due to the RF signal leaking from the signal path between the antenna terminal ANT_LB and the transceiving terminal TRX_LB and to suppress the increase in chip area. This can be understood from FIG. 8. For example, as indicated by characteristics 901 and 902 illustrated in FIG. 8, under the condition 803, the chip area does not increase much but the intermodulation distortion characteristics are further improved, compared with the condition 802.

When an increase in chip area is allowed, the $n^+$ resistor Rnp may be used for the coupling resistor Rcs in the second high-frequency switch 105 in addition to the first high-frequency switches 102 to 104. According to this configuration, it is possible to reduce the intermodulation distortion occurring in the first high-frequency switches 102 to 104 and the intermodulation distortion occurring due to the RF signal leaking from the second high-frequency switch 105.

As another appropriate method of reducing the intermodulation distortion while suppressing the increase in the chip area, a method of implementing the coupling resistor using a combined resistor in which the $n^+$ resistor Rnp and the channel resistor Rch are connected in series can be used.

Figure 9:
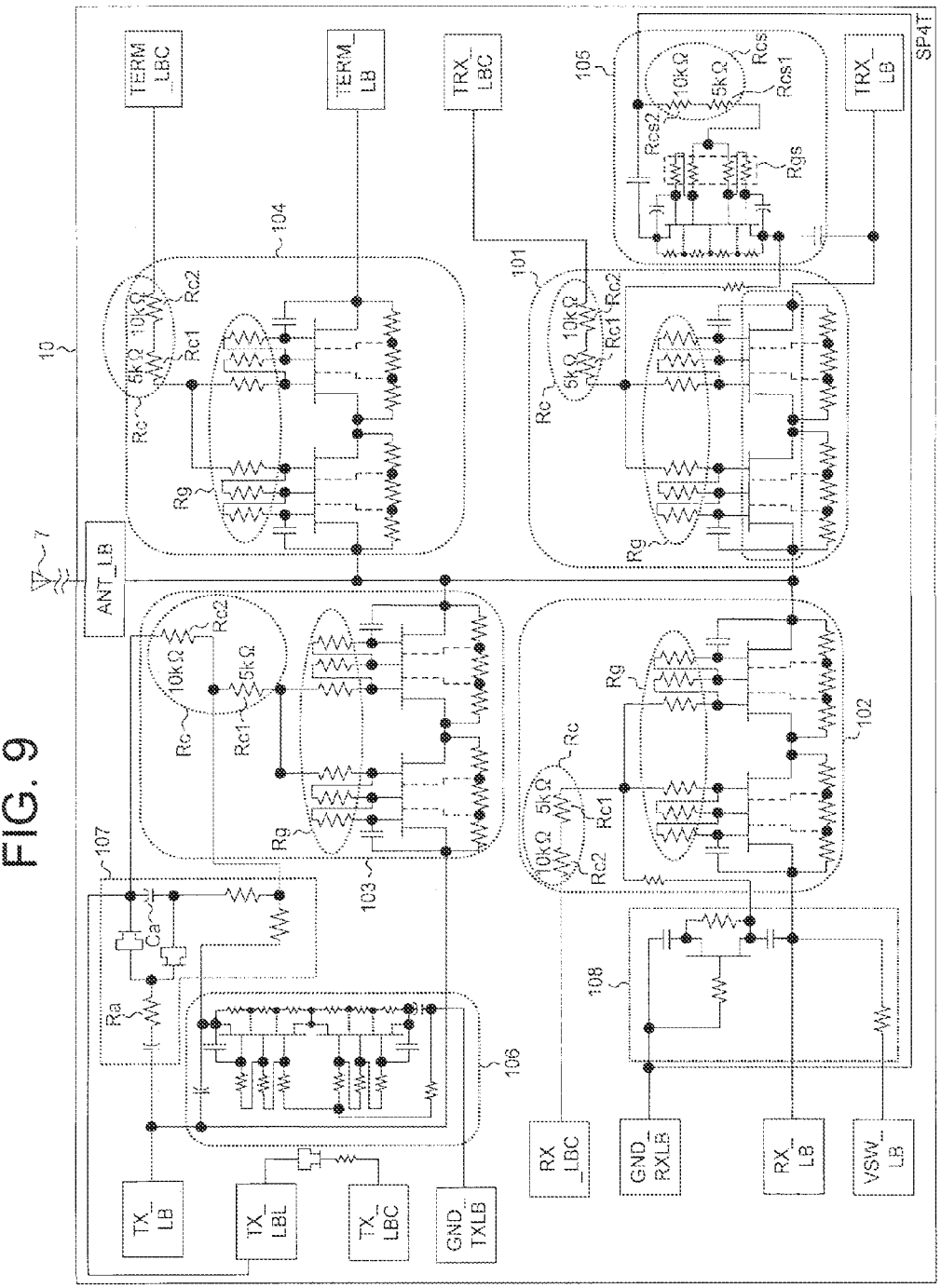
FIG. 9 is a circuit diagram illustrating another example of the circuit configuration of the low-band switch circuit 10.

FIG. 9 is a circuit diagram illustrating an example of the low-band switch circuit 10 when the coupling resistor is implemented using a combined resistor in which the $n^+$ resistor Rnp and the channel resistor Rch are connected in series. As illustrated in the drawing, the first high-frequency switch 101 uses a combined resistor Rc in which the resistor Rc1 formed of the $n^+$ resistor Rnp and the resistor Rc2 formed of the channel resistor Rch are connected in series as the coupling resistor. Although not limiting, FIG. 9 illustrates an example where the resistor Rc1 is set to 5 kΩ and the resistor Rc2 is set to 10 kΩ.

The current-voltage characteristics of the combined resistor Rc of the resistor Rc1 and the resistor Rc2 are, for example, characteristics 406 and 506 illustrated in FIGS. 5 and 6. As illustrated in FIGS. 5 and 6, it can be understood that the characteristic of the combined resistor Rc of the resistor Rc1 (5 kΩ) and the resistor Rc2 (10 kΩ) have a linearity lower than characteristic 405 (505) when the same resistor of 15 kΩ is embodied by only the $n^+$ resistor Rnp but have a linearity higher than characteristic 401 (501) when the same resistor of 15 kΩ is embodied by only the channel resistor Rch. Accordingly, by using the combined resistor Rc of the channel resistor Rch and the $n^+$ resistor Rnp for the coupling resistor in the first high-frequency switch 101, it is possible to greatly improve the intermodulation distortion and to further suppress the chip area, compared with the case where the coupling resistor Rc is formed of only the $n^+$ resistor Rnp.

By using the combined resistor of the channel resistor Rch and the $n^+$ resistor Rnp for the coupling resistors Rc in the first high-frequency switches 102 to 104 and the coupling resistor Rcs in the second high-frequency switch 105 in addition to the first high-frequency switch 101, it is possible to suppress the increase in chip area and to further improve the intermodulation distortion, as described above. FIG. 9 illustrates a circuit configuration example where the coupling resistors Rc in the first high-frequency switches 101 to 104 and the coupling resistor Rcs in the second high-frequency switch 105 are formed of the combined resistor of the channel resistor Rch and the $n^+$ resistor Rnp.

<Circuit Configuration of High-Band Switch Circuit 11>

Figure 10:
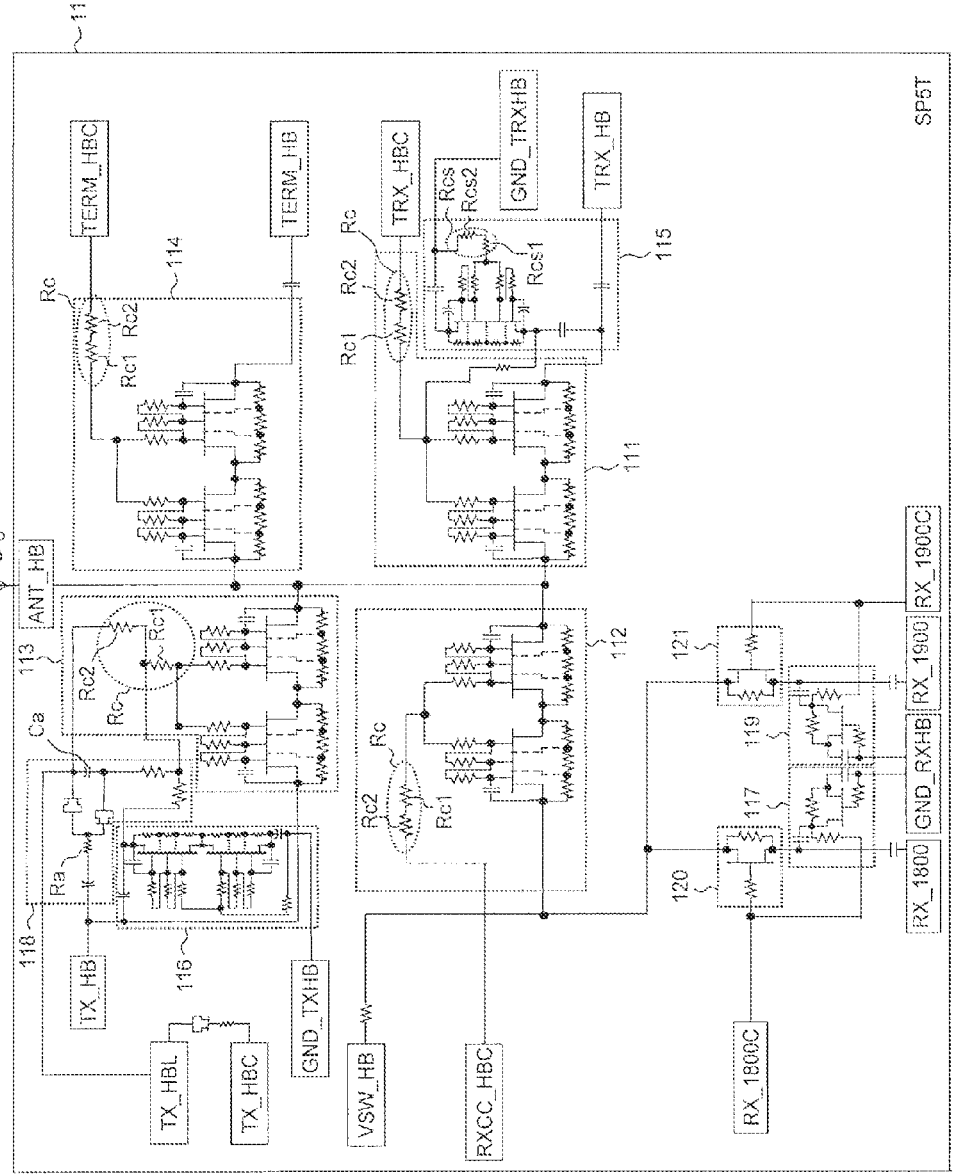
FIG. 10 is a circuit diagram illustrating an example of a circuit configuration of a high-band switch circuit 11.

FIG. 10 is a circuit diagram illustrating an example of a circuit configuration of the high-band switch circuit 11. The switch circuit 11 includes four first high-frequency switches 111 to 114, four second high-frequency switches 115 to 117 and 119, two third high-frequency switches 120 and 121, a gate control circuit 118, and plural terminals. The plural terminals include, for example, an antenna terminal ANT_HB, receiving terminals RX_1800 and RX_1900, a transmitting terminal TX_HB, a transceiving terminal TRX_HB, a termination terminal TERM_HB, plural control terminals TX_HBC, RXCC_HBC, TRX_HBC, TERM_HBC, VSW_HB, RX_1800C, and RX_1900C, and plural power source terminals GND_TXHB, GND_TRXHB, and GND_RXHB. Reference signs denoting the plural terminals in the switch circuit 11 represent nodes connected to the corresponding terminals in addition to the corresponding terminals.

The antenna terminal ANT_HB is connected to the antenna 8. The transceiving terminal TRX_HB is a terminal that is supplied with a high-band RF transmission signal and a high-band RF reception signal of a W-CDMA system and is connected to the band-pass filter 18. The first high-frequency switch 111 is disposed between the transceiving terminal TRX_HB and the antenna terminal ANT_HB. The ON and OFF states of the first high-frequency switch 111 are controlled by the control signal supplied to the control terminal TRX_HBC out of the control signals SC. The second high-frequency switch 115 is disposed between the transceiving terminal TRX_HB and the power source terminal GND_TRXHB. The ON and OFF states of the second high-frequency switch 115 are controlled by the control signal supplied to the control terminal TRX_HBC. For example, the second high-frequency switch 115 forms a signal path between the transceiving terminal TRX_HB and the power source terminal GND_TRXHB connected to the ground potential in a period in which the first high-frequency switch 111 is turned off. Accordingly, the impedance of the transceiving terminal TRX_HB when the first high-frequency switch 111 is turned off is lowered.

The transmitting terminal TX_HB is a terminal that is supplied with a high-band RF transmission signal of a GSM system. The first high-frequency switch 113 is disposed between the transmitting terminal TX_HB and the antenna terminal ANT_HB. The ON and OFF states of the first high-frequency switch 113 are controlled by the control signal supplied to the control terminal TX_HBC out of the control signals SC. Specifically, the gate control circuit 118 charges a capacitor Ca using the control signal supplied to the control terminal TX_HBC and the RF transmission signal supplied to the transmitting terminal TX_HB. The first high-frequency switch 113 is driven with the output voltage corresponding to the sum of the charged voltage of the capacity Ca and the voltage of the control signal supplied to the control terminal TX_HBC. The second high-frequency switch 116 is disposed between the transmitting terminal TX_HB and the power source terminal GND_TXHB. The ON and OFF states of the second high-frequency switch 116 are controlled by the control signal supplied to the control terminal TRX_HBC. For example, the second high-frequency switch 116 forms a signal path between the transmitting terminal TX_HB and the power source terminal GND_TXHB connected to the ground potential in a period in which the first high-frequency switch 113 is turned off. Accordingly, the impedance of the transmitting terminal TX_HB when the first high-frequency switch 113 is turned off is lowered.

The signal path of an RF reception signal of a GSM system in the switch circuit 11 includes a signal path of a 1900 MHz RF reception signal and a signal path of a 1800 MHz RF reception signal. The control terminal VSW_HB is a terminal supplied with the control signal for determining a reference DC voltage out of the control signals SC. The first high-frequency switch 112 is disposed between the control terminal VSW_HB and the antenna terminal ANT_HB. The ON and OFF states of the first high-frequency switch 112 are controlled by the control signal supplied to the control terminal RXCC_HBC. The third high-frequency switch 120 is disposed between the control terminal VSW_HB and the receiving terminal RX_1800. The ON and OFF states of the third high-frequency switch 120 are controlled by the control signal supplied to the control terminal RX_1800C out of the control signals SC. That is, by turning on the first high-frequency switch 112 and the third high-frequency switch 120, the 1800 MHz RF reception signal received by the antenna 8 is supplied to the receiving terminal RX_1800.

The third high-frequency switch 121 is disposed between the control terminal VSW_HB and the receiving terminal RX_1900. The ON and OFF states of the third high-frequency switch 121 are controlled by the control signal supplied to the control terminal RX_1900C out of the control signals SC. That is, by turning on the first high-frequency switch 112 and the third high-frequency switch 121, the 1900 MHz RF reception signal received by the antenna 8 is supplied to the receiving terminal RX_1900.

The second high-frequency switch 117 is disposed between the receiving terminal RX_1800 and the power source terminal GND_RXHB. The ON and OFF states of the second high-frequency switch 117 are controlled by the control signal supplied to the control terminal RX_1800C. For example, the second high-frequency switch 117 forms a signal path between the receiving terminal RX_1800 and the power source terminal GND_RXHB connected to the ground potential in a period in which the third high-frequency switch 120 is turned off. Accordingly, the impedance of the receiving terminal RX_1800 when the third high-frequency switch 120 is turned off is lowered. Similarly, the second high-frequency switch 119 is disposed between the receiving terminal RX_1900 and the power source terminal GND_RXHB. The ON and OFF states of the second high-frequency switch 119 are controlled by the control signal supplied to the control terminal RX_1900C. For example, the second high-frequency switch 119 forms a signal path between the receiving terminal RX_1900 and the power source terminal GND_RXHB in a period in which the third high-frequency switch 121 is turned off. Accordingly, the impedance of the receiving terminal RX_1900 is lowered.

The termination terminal TERM_HB is a terminal that is connected to an externally-added resistor 23 for terminating the node connected to the antenna terminal ANT_HB. The first high-frequency switch 114 is disposed between the termination terminal TERM_HB and the antenna terminal ANT_HB. The ON and OFF states of the first high-frequency switch 114 are controlled by the control signal supplied to the control terminal TERM_HBC out of the control signals SC. For example, when transmission and reception of a low-band RF signal is performed in a period in which transmission and reception of a high-band RF signal, it is possible to reduce reflection of a low-band RF signal at the node by turning on the first high-frequency switch 114 to terminate the node connected to the antenna terminal ANT_LB.

The basic circuit configurations of the first high-frequency switches 111 to 114 are the same as the first high-frequency switches 101 to 104 on the low band side. The basic circuit configurations of the first high-frequency switches 111 to 114 are the same as the second high-frequency switches 105 and 106 on the low band side. The ratio at which the $n^+$ resistor Rnp having high linearity is used for the gate-control resistors in the first high-frequency switches 111 to 114 or the second high-frequency switches 105 and 106 is determined depending on the intermodulation distortion characteristics desired for the antenna switch 1 and the allowable chip area, similarly to the low band side. Similarly to FIG. 9, FIG. 10 illustrates an example where the coupling resistors Rc of the first high-frequency switches 111 to 114 and the coupling resistor Rcs of the second high-frequency switch 115 are embodied by the combined resistor of a resistor Rc1 (Rcs1) formed of an $n^+$ resistor Rnp and a resistor Rc2 (Rcs2) formed of a channel resistor Rch. Accordingly, similarly to the switch circuit 10 on the low band side, it is possible to suppress an increase in chip area and to further improve the intermodulation distortion.

<Connection Relationship Between RF Module 30 and Control IC 2>

Figure 11:
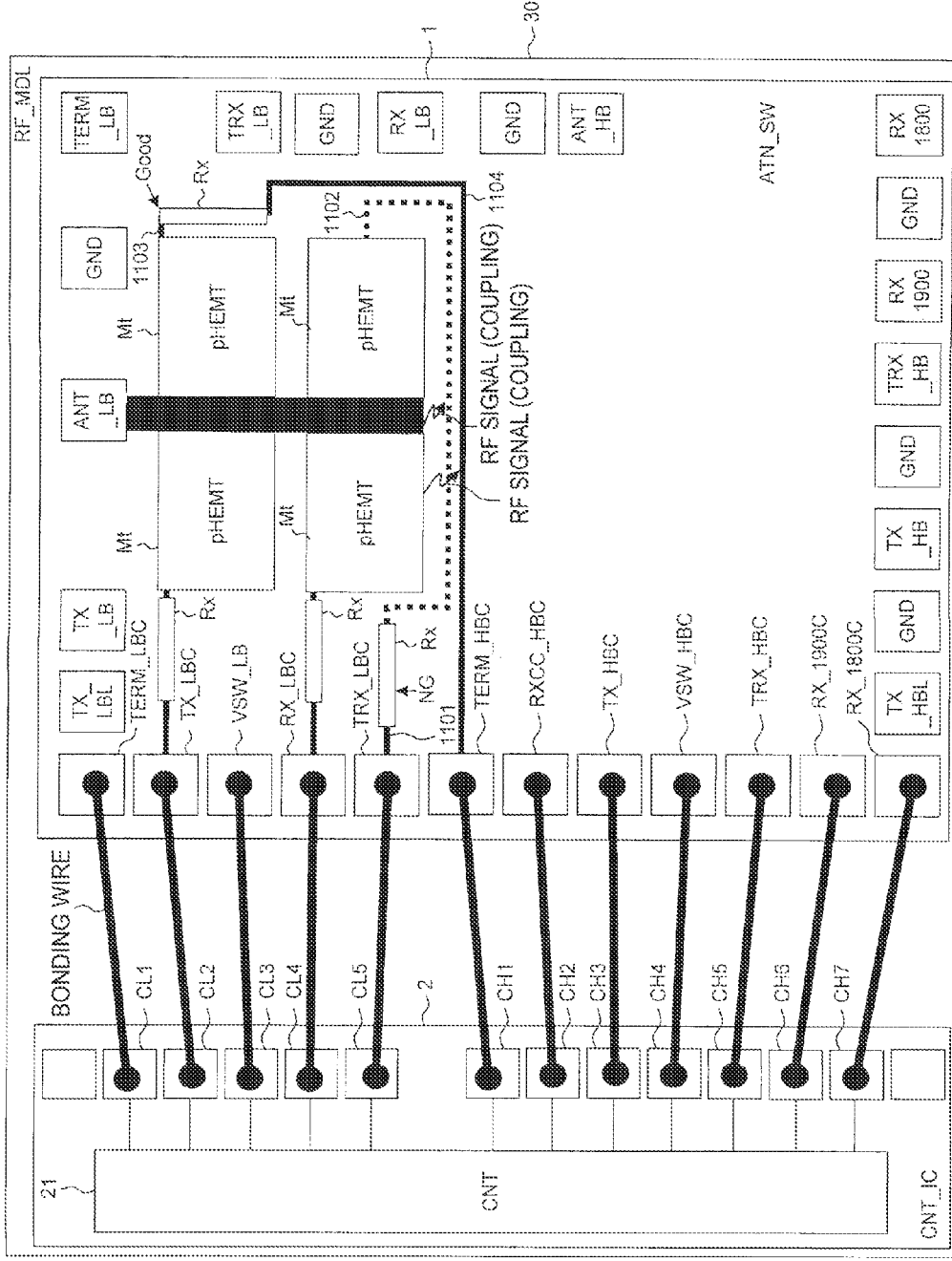
FIG. 11 is an explanatory diagram illustrating a configuration of an RF module 30.

FIG. 11 is an explanatory diagram illustrating a configuration of the RF module 30.

As described above, the antenna switch 1 and the control IC 2 are embodied as a single RF module 30. As illustrated in FIG. 11, in the RF module 30, some terminals of the control IC 2 and some terminals of the antenna switch 1 are connected to each other, for example, by bonding wires. Specifically, output terminals CL1 to CL5 outputting the control signals for controlling the ON and OFF states of the high-frequency switches in the switch circuit 10 out of the control signals SC and output terminals CH1 to CH7 outputting the control signals for controlling the ON and OFF states of the high-frequency switches in the switch circuit 11 out of the control signals SC are arranged along one side of the control IC 2. The control terminals (for example, TERM_LBC, TX_LBC, VSW_LB, RX_LBC, TRX_LBC, TERM_HBC, RXCC_HBC, RXCC_HBC, TX_HBC, VSW_HBC, TRX_HBC, RX_1900C, and RX_1800C) are arranged along one side of the antenna switch 1 facing the control IC 2. The output terminals and the control terminals corresponding to the output terminals are connected to each other by bonding wires.

<Layout in Antenna Switch 1>

The layout of the field-effect transistors Mt, the gate-control resistors Rx, and the control terminals in the first high-frequency switches 101 to 104 of the antenna switch 1 on a semiconductor substrate will be described below. In FIG. 11, the gate-control resistors including the coupling resistors Rc and the gate resistors Rg are denoted by reference sign "Rx".

When a gate-control resistor Rx is disposed at a position spaced apart from the corresponding field-effect transistor Mt, as illustrated in FIG. 11, an interconnection 1101 between the gate-control resistor Rx and the control terminal is shortened, but an interconnection 1102 between the gate-control resistor Rx and the field-effect transistor Mt is elongated. When the length of the interconnection 1102 is large, an RF signal may directly propagate as noise to the gate of the field-effect transistor Mt by coupling and may deteriorate the characteristics of the field-effect transistor Mt. Therefore, the gate-control resistor Rx is disposed in the vicinity of the corresponding field-effect transistor Mt. For example, as illustrated in FIG. 11, the gate-control resistor Rx is disposed so that an interconnection 1103 between the gate-control resistor Rx and the field-effect transistor Mt is shorter than an interconnection 1104 between the control terminal and the gate-control resistor Rx. According to this configuration, it is possible to reduce an influence of coupling due to the interconnection between the gate-control resistor Rx and the field-effect transistor Mt. Even when an RF signal propagates as noise to the interconnection 1104 by coupling, the gate side of the field-effect transistors Mt when viewed from the interconnection 1104 has high impedance and thus the characteristics of the field-effect transistor Mt are not much deteriorated by the noise. For this reason, it is preferable that the gate resistors Rg and the coupling resistors Rc in the gate-control resistor Rx be disposed so as to shorten the interconnection length between the gate resistors Rg and the coupling resistors Rc (Rc1 and Rc2).

According to the antenna switch 1 of this embodiment, by preferentially using an $n^+$ resistor Rnp for the coupling resistors Rc to which a voltage with relatively large amplitude is applied, it is possible to suppress an increase in chip area and to reduce intermodulation distortion occurring in the whole antenna switch when an RF transmission signal of a W-CDMA system is transmitted and received. By disposing the gate-control resistor Rx in the vicinity of the corresponding field-effect transistor Mt to shorten the interconnection between the gate-control resistor Rx and the field-effect transistor Mt, it is possible to reduce an adverse influence to the field-effect transistor Mt by coupling.

While the present invention made by the inventor is specifically described above in conjunction with the embodiments, the present invention is not limited to the embodiments and can be modified in various forms without departing from the scope of the present invention.

For example, by using an $n^+$ resistor for the gate-control resistors Rc and Rcs and also using an $n^+$ resistor for the resistors Ra of the gate control circuit 108 in FIGS. 2, 9, and 10, it is possible to further reduce the intermodulation distortion occurring due to a leaking RF signal.

Additionally, although the above example describes the antenna switch 1 formed on a substrate of compound semiconductor such as GaAs, the present invention is not limited to such an example. The antenna switch may be formed on a semiconductor substrate of monocrystalline silicon using a known CMOS integrated circuit manufacturing technique. In this case, when a semiconductor layer having relatively high linearity of the current-voltage characteristics is used for the coupling resistor Rc1 in the CMOS process, it is possible to greatly improve the intermodulation distortion as described above.

In FIG. 9, the resistance values of the resistor Rc1 and the resistor Rc2 constituting the coupling resistor Rc are set to 5 kΩ and 10Ω, respectively, but the present invention is not limited to this setting and the resistance values may be changed depending on the desired intermodulation distortion characteristics or the allowable chip area.

FIG. 10 illustrates the switch circuit 11 in which a combined resistor of a channel resistor Rch and an $n^+$ resistor Rnp is used for the coupling resistors Rc of the first high-frequency switches 111 to 114 and the coupling resistor Rcs of the second high-frequency switch 115, but the present invention is not limited to this configuration. For example, as illustrated in FIG. 2, the coupling resistors Rc of the first high-frequency switches 111 to 114 and the coupling resistor Rcs of the second high-frequency switch 115 may be embodied by only the $n^+$ resistor Rnp.

REFERENCE SIGNS LIST

100: mobile phone
1: antenna switch (ANT_SW)
10: switch circuit (SP4T)
11: switch circuit (SP5T)
2: control IC (CNT_IC)
201: control unit
202, 204: high-frequency power amplifier
203: power control unit (APC)
3: RFIC
4: baseband unit (BB)
5: microphone (MIC)
6: speaker (SPKR)
7, 8: antenna
13, 14, 17, 18, 19: band-pass filter
15: high-frequency power amplifier (HPA)
101 to 104: first high-frequency switch
105 to 107: second high-frequency switch
108: gate control circuit
Rg, Rg_1 to Rg_6, Rgs, Rgs_1 to Rgs_4: gate resistor
Rc, Rcs: coupling resistor
Mt: field-effect transistor
M1 to M6: HEMT
Rd, Rd_1 to Rd_6: drain-source resistor
C1 to C4, Ca: capacitor
Ra: resistor
601: GaAs semiconductor substrate
602: buffer layer
603: electron supply layer
604: channel layer
605: electron supply layer
606, 608: cap layer ($n^+$ layer)
607: electrode formed of ohmic layer
401, 501: characteristic of channel resistor Rch of 15 kΩ
402, 502: characteristic of channel resistor Rch of 10 kΩ
403, 503: characteristic of channel resistor Rch of 5 kΩ
404, 504: characteristic of $n^+$ resistor Rnp of 5 kΩ
405, 505: characteristic of $n^+$ resistor Rnp of 15 kΩ
406, 506: characteristic of combined resistor having $n^+$ resistor Rnp of 10 kΩ and channel resistor Rch of 5 kΩ connected in series
801 to 807: applicable condition of $n^+$ resistor Rnp and channel resistor Rch in gate-control resistor and characteristic of intermodulation distortion under applicable condition
901: characteristic of intermodulation distortion
902: increase rate of chip area
Rc1: channel resistor Rch of 5 kΩ
Rc2: $n^+$ resistor Rnp of 10 kΩ
111 to 114: first high-frequency switch
115: second high-frequency switch CL1 to C15, CH1 to CH7: output terminal
ANT_LB: antenna terminal
RX_LB: receiving terminal
TX_LB: transmitting terminal
TRX_LB: transceiving terminal
TERM_LB: termination terminal
TX_LBC, RX_LBC, TRX_LBC, TERM_LBC, VSW_LB: control terminal
GND_TXLB, GND_RXLB: power source terminal

What is claimed is:

1. A semiconductor comprising:
an antenna terminal connected to an antenna;
a plurality of external terminals configured to be supplied with an RF signal;
a plurality of first high-frequency switches disposed between the antenna terminal and the external terminals; and
a plurality of control terminals configured to receive a control signal for switching ON and OFF states of the first high-frequency switches,
wherein each first high-frequency switch includes
a plurality of first field-effect transistors disposed between the corresponding external terminal and the antenna terminal and connected in series,
a plurality of first resistors connected to the gate terminals of the plurality of first field-effect transistors, and
a second resistor disposed between the corresponding control terminal and the first resistors,
wherein at least one terminal of the plurality of external terminals is a first terminal configured to be supplied with an RF transmission signal and an RF reception signal of a frequency division duplex system,
wherein the second resistor in the first high-frequency switch disposed between the first terminal and the antenna terminal is configured so that linearity of current-voltage characteristics thereof is higher than linearity of current-voltage characteristics of the first resistor,
wherein one external terminal of the plurality of external terminals is a second terminal configured to be supplied with a transmission signal of a first communication system other than the frequency division duplex system and another external terminal thereof is a third terminal configured to be supplied with a reception signal of the first communication system, and
wherein the second resistor in the first high-frequency switch disposed between the second terminal and the antenna terminal and the second resistor in the first high-frequency switch disposed between the third terminal and the antenna terminal are configured so that linearity of current-voltage characteristics thereof is higher than linearity of current-voltage characteristics of the first resistor.

2. A semiconductor comprising:
an antenna terminal connected to an antenna;
a plurality of external terminals configured to be supplied with an RF signal;
a plurality of first high-frequency switches disposed between the antenna terminal and the external terminals; and
a plurality of control terminals configured to receive a control signal for switching ON and OFF states of the first high-frequency switches,
wherein each first high-frequency switch includes
a plurality of first field-effect transistors disposed between the corresponding external terminal and the antenna terminal and connected in series,
a plurality of first resistors connected to the gate terminals of the plurality of first field-effect transistors, and
a second resistor disposed between the corresponding control terminal and the first resistors,
wherein at least one terminal of the plurality of external terminals is a first terminal configured to be supplied with an RF transmission signal and an RF reception signal of a frequency division duplex system,
wherein the second resistor in the first high-frequency switch disposed between the first terminal and the antenna terminal is configured so that linearity of current-voltage characteristics thereof is higher than linearity of current-voltage characteristics of the first resistor,
wherein one external terminal of the plurality of external terminals is a fourth terminal connected to a terminal circuit, and
wherein the second resistor in the first high-frequency switch disposed between the fourth terminal and the antenna terminal is configured so that linearity of current-voltage characteristics thereof is higher than linearity of current-voltage characteristics of the first resistor.

3. A semiconductor comprising:
an antenna terminal connected to an antenna;
a plurality of external terminals configured to be supplied with an RF signal;
a plurality of first high-frequency switches disposed between the antenna terminal and the external terminals; and
a plurality of control terminals configured to receive a control signal for switching ON and OFF states of the first high-frequency switches,
wherein each first high-frequency switch includes
a plurality of first field-effect transistors disposed between the corresponding external terminal and the antenna terminal and connected in series,
a plurality of first resistors connected to the gate terminals of the plurality of first field-effect transistors, and
a second resistor disposed between the corresponding control terminal and the first resistors,
wherein at least one terminal of the plurality of external terminals is a first terminal configured to be supplied with an RF transmission signal and an RF reception signal of a frequency division duplex system,
wherein the second resistor in the first high-frequency switch disposed between the first terminal and the antenna terminal is configured so that linearity of current-voltage characteristics thereof is higher than linearity of current-voltage characteristics of the first resistor,
wherein the first resistor is formed of a first semiconductor layer, and
wherein the second resistor is formed of a second semiconductor layer having resistivity per unit area lower than that of the first semiconductor layer.

4. The semiconductor device according to claim 3, wherein the first high-frequency switch further includes a third resistor connected in series to the second resistor, and wherein the third resistor is formed of the first semiconductor layer.

5. A semiconductor comprising:
an antenna terminal connected to an antenna;
a plurality of external terminals configured to be supplied with an RF signal;
a plurality of first high-frequency switches disposed between the antenna terminal and the external terminals; and
a plurality of control terminals configured to receive a control signal for switching ON and OFF states of the first high-frequency switches,
wherein each first high-frequency switch includes
    a plurality of first field-effect transistors disposed between the corresponding external terminal and the antenna terminal and connected in series,
    a plurality of first resistors connected to the gate terminals of the plurality of first field-effect transistors, and
    a second resistor disposed between the corresponding control terminal and the first resistors,
wherein at least one terminal of the plurality of external terminals is a first terminal configured to be supplied with an RF transmission signal and an RF reception signal of a frequency division duplex system,
wherein the second resistor in the first high-frequency switch disposed between the first terminal and the antenna terminal is configured so that linearity of current-voltage characteristics thereof is higher than linearity of current-voltage characteristics of the first resistor, and
wherein a signal line connecting one end of a resistor circuit including the first resistor and the second resistor and the gate terminal of the first field-effect transistor is shorter than a signal line connecting the other end of the resistor circuit and the control terminal.

6. A semiconductor comprising:
an antenna terminal connected to an antenna;
a plurality of external terminals configured to be supplied with an RF signal;
a plurality of first high-frequency switches disposed between the antenna terminal and the external terminals;
a plurality of control terminals configured to receive a control signal for switching ON and OFF states of the first high-frequency switches,
wherein each first high-frequency switch includes
    a plurality of first field-effect transistors disposed between the corresponding external terminal and the antenna terminal and connected in series,
    a plurality of first resistors connected to the gate terminals of the plurality of first field-effect transistors, and
    a second resistor disposed between the corresponding control terminal and the first resistors,
wherein at least one terminal of the plurality of external terminals is a first terminal configured to be supplied with an RF transmission signal and an RF reception signal of a frequency division duplex system, and
wherein the second resistor in the first high-frequency switch disposed between the first terminal and the antenna terminal is configured so that linearity of current-voltage characteristics thereof is higher than linearity of current-voltage characteristics of the first resistor; and
a second high-frequency switch configured to form a signal path between the first terminal and a ground node when the plurality of field-effect transistors of the first high-frequency switch disposed between the antenna terminal and the first terminal are turned off,
wherein the second high-frequency switch includes
    a plurality of second field-effect transistors disposed between the first terminal and the ground node and that are connected in series,
    a plurality of fourth resistors connected to the gate terminals of the plurality of second field-effect transistors, and
    a fifth resistor disposed between the ground node and the fourth resistors, and
wherein the fifth resistor is configured so that linearity of current-voltage characteristics thereof is higher than linearity of current-voltage characteristics of the fourth resistor.

7. The semiconductor device according to claim 6, wherein the fourth resistor is formed of a first semiconductor layer, and wherein the fifth resistor is formed of a second semiconductor layer having resistivity per unit area lower than that of the first semiconductor layer.

8. The semiconductor device according to claim 7, wherein the second high-frequency switch further includes a sixth resistor connected in series to the fifth resistor, and wherein the sixth resistor is formed of the first semiconductor layer.

9. A high-frequency module comprising a semiconductor device, the semiconductor device comprising:
an antenna terminal connected to an antenna;
a plurality of external terminals configured to be supplied with an RF signal;
a plurality of first high-frequency switches disposed between the antenna terminal and the external terminals;
a plurality of control terminals configured to receive a control signal for switching ON and OFF states of the first high-frequency switches,
wherein each first high-frequency switch includes
    a plurality of first field-effect transistors disposed between the corresponding external terminal and the antenna terminal and connected in series,
    a plurality of first resistors connected to the gate terminals of the plurality of first field-effect transistors, and
    a second resistor disposed between the corresponding control terminal and the first resistors,
wherein at least one terminal of the plurality of external terminals is a first terminal configured to be supplied with an RF transmission signal and an RF reception signal of a frequency division duplex system, and
wherein the second resistor in the first high-frequency switch disposed between the first terminal and the antenna terminal is configured so that linearity of current-voltage characteristics thereof is higher than linearity of current-voltage characteristics of the first resistor; and
a control semiconductor device configured to generate the control signal,
wherein one external terminal of the plurality of external terminals is a second terminal configured to be supplied with a transmission signal of a first communication system other than the frequency division duplex system and another external terminal thereof is a third terminal configured to be supplied with a reception signal of the first communication system, and
wherein the second resistor in the first high-frequency switch disposed between the second terminal and the antenna terminal and the second resistor in the first high-frequency switch disposed between the third terminal and the antenna terminal are configured so that linearity of current-voltage characteristics thereof is higher than linearity of current-voltage characteristics of the first resistor.

10. A semiconductor device comprising:

an antenna terminal connected to an antenna;

a transceiving terminal configured to be supplied with an RF transmission signal and an RF reception signal of a frequency division duplex system; and a first high-frequency switch disposed between the antenna terminal and the transceiving terminal, wherein the first high-frequency switch includes a plurality of field-effect transistors connected in series, and a resistor circuit configured to receive a control signal for controlling ON and OFF states of the plurality of field-effect transistors and drive the plurality of field-effect transistors, wherein the resistor circuit includes a plurality of first resistors connected to the gate terminals of the plurality of field-effect transistors, and a second resistor configured to supply the control signal supplied to one end thereof to the first resistors connected to the other end thereof, wherein the second resistor is configured so that linearity of current-voltage characteristics thereof is higher than linearity of current-voltage characteristics of the first resistor, wherein the first resistor is formed of a first semiconductor layer, and wherein the second resistor is formed of a second semiconductor layer having resistivity per unit area lower than that of the first semiconductor layer.

11. The semiconductor device according to claim 10, wherein the first high-frequency switch further includes a third resistor connected in series to the second resistor, and wherein the third resistor is formed of the first semiconductor layer.

* * * * *